United States Patent
Jung et al.

(10) Patent No.: US 9,877,192 B2
(45) Date of Patent: Jan. 23, 2018

(54) MOBILE TERMINAL AND METHOD OF CONTROLLING THE SAME

(71) Applicant: LG ELECTRONICS INC., Seoul (KR)

(72) Inventors: Eunsoo Jung, Seoul (KR); Minjoo Kim, Seoul (KR); Euitaek Oh, Seoul (KR); Sunhee Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/070,208

(22) Filed: Mar. 15, 2016

(65) Prior Publication Data
US 2017/0026831 A1 Jan. 26, 2017

(30) Foreign Application Priority Data

Jul. 23, 2015 (KR) .......................... 10-2015-0104516

(51) Int. Cl.
| | | |
|---|---|---|
| *H04M 1/66* | (2006.01) | |
| *H04W 12/06* | (2009.01) | |
| *G06F 21/32* | (2013.01) | |
| *G06F 21/36* | (2013.01) | |
| *G06F 21/84* | (2013.01) | |
| *H04L 9/32* | (2006.01) | |
| *H04L 29/06* | (2006.01) | |
| *H04W 12/08* | (2009.01) | |

(52) U.S. Cl.
CPC ............ *H04W 12/06* (2013.01); *G06F 21/32* (2013.01); *G06F 21/36* (2013.01); *G06F 21/84* (2013.01); *H04L 9/3231* (2013.01); *H04L 63/08* (2013.01); *H04W 12/08* (2013.01)

(58) Field of Classification Search
CPC ...... H04L 63/08; H04L 9/3231; H04W 12/08; H04W 12/06; G06F 21/32
USPC ....................................................... 455/411
See application file for complete search history.

(56) References Cited

U.S. PATENT DOCUMENTS

2014/0013424 A1   1/2014   Lv

FOREIGN PATENT DOCUMENTS

| EP | 2713298 A1 | 4/2014 |
|---|---|---|
| EP | 2835755 A1 | 2/2015 |
| WO | WO 2014/101856 A1 | 7/2014 |

*Primary Examiner* — Charles Shedrick
(74) *Attorney, Agent, or Firm* — Birch, Stewart, Kolasch & Birch, LLP

(57) ABSTRACT

A mobile terminal including a camera provided at a terminal body; a touch screen configured to output a preview image received through the camera; and a controller configured to perform an authentication process associated with an object included in the preview image and for obtaining security-set information for operating the object included in the preview image, and output the security-set information when the authentication process is successfully performed based on input authentication information.

13 Claims, 31 Drawing Sheets

MOBILE TERMINAL AND METHOD OF CONTROLLING THE SAME

CROSS-REFERENCE TO RELATED APPLICATION

Pursuant to 35 U.S.C. §119(a), this application claims the benefit of earlier filing date and right of priority to Korean Application No. 10-2015-0104516, filed on Jul. 23, 2015, the contents of which is incorporated by reference herein in its entirety.

BACKGROUND OF THE INVENTION

1. Field of the Invention

This specification relates to a mobile terminal and a method of controlling the same.

2. Background of the Invention

Terminals may be divided into mobile/portable terminals and stationary terminals. Also, the mobile terminals may be classified into handheld terminals and vehicle mount terminals according to whether or not a user can directly carry. As it becomes multifunctional, a mobile terminal can capture still images or moving images, play music or video files, play games, receive broadcast and the like, so as to be implemented as an integrated multimedia player.

Many efforts include not only changes and improvement of structural components implementing a mobile terminal, but also software improvement to support and improve functions of the terminal. Further, home electronics or Internet sites increasingly require security information or personal information. In addition, a terminal can store information related to privacy of a person, such as the personal information, the security information and the like. However, losing the terminal increases the risk of exposing privacy-related information to an unwanted party.

SUMMARY OF THE INVENTION

Therefore, an aspect of the detailed description is to provide a mobile terminal and corresponding method for providing security information or personal information to a user, if required, even though the user cannot remember the security or personal information.

Another aspect of the detailed description is to provide a mobile terminal and corresponding method for strengthening security. In more detail, one aspect of the detailed description is to provide a mobile terminal and corresponding method allowing only an authorized user to access specific information or a specific function.

Still another aspect of the detailed description is to provide a mobile terminal and corresponding method for providing a graphic user interface (GUI) allowing a user to access a security-set information or function more intuitively and conveniently.

To achieve these and other advantages and in accordance with the purpose of this specification, as embodied and broadly described herein, the present invention provides in one aspect a mobile terminal including a camera provided at a terminal body; a touch screen configured to output a preview image received through the camera; and a controller configured to perform an authentication process associated with an object included in the preview image and for obtaining security-set information for operating the object included in the preview image, and output security-set information when the authentication process is successfully performed based on input authentication information.

In another aspect, the present invention provides a method of controlling a mobile terminal, the method including outputting, via a touch screen of the mobile terminal, a preview image received through a camera of the mobile terminal; performing, via a controller of the mobile terminal, an authentication process associated with an object included in the preview image and for obtaining security-set information for operating the object included in the preview image; and outputting, via the controller, security-set information when the authentication process is successfully performed based on input authentication information.

Further scope of applicability of the present invention will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate embodiments and together with the description serve to explain the principles of the invention.

In the drawings.

DETAILED DESCRIPTION OF THE INVENTION

Description will now be given in detail according to embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. The accompanying drawings are used to help easily understand various technical features and it should be understood that the embodiments presented herein are not limited by the accompanying drawings. As such, the present invention should be construed to extend to any alterations, equivalents and substitutes in addition to those which are particularly set out in the accompanying drawings.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like. By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1A:
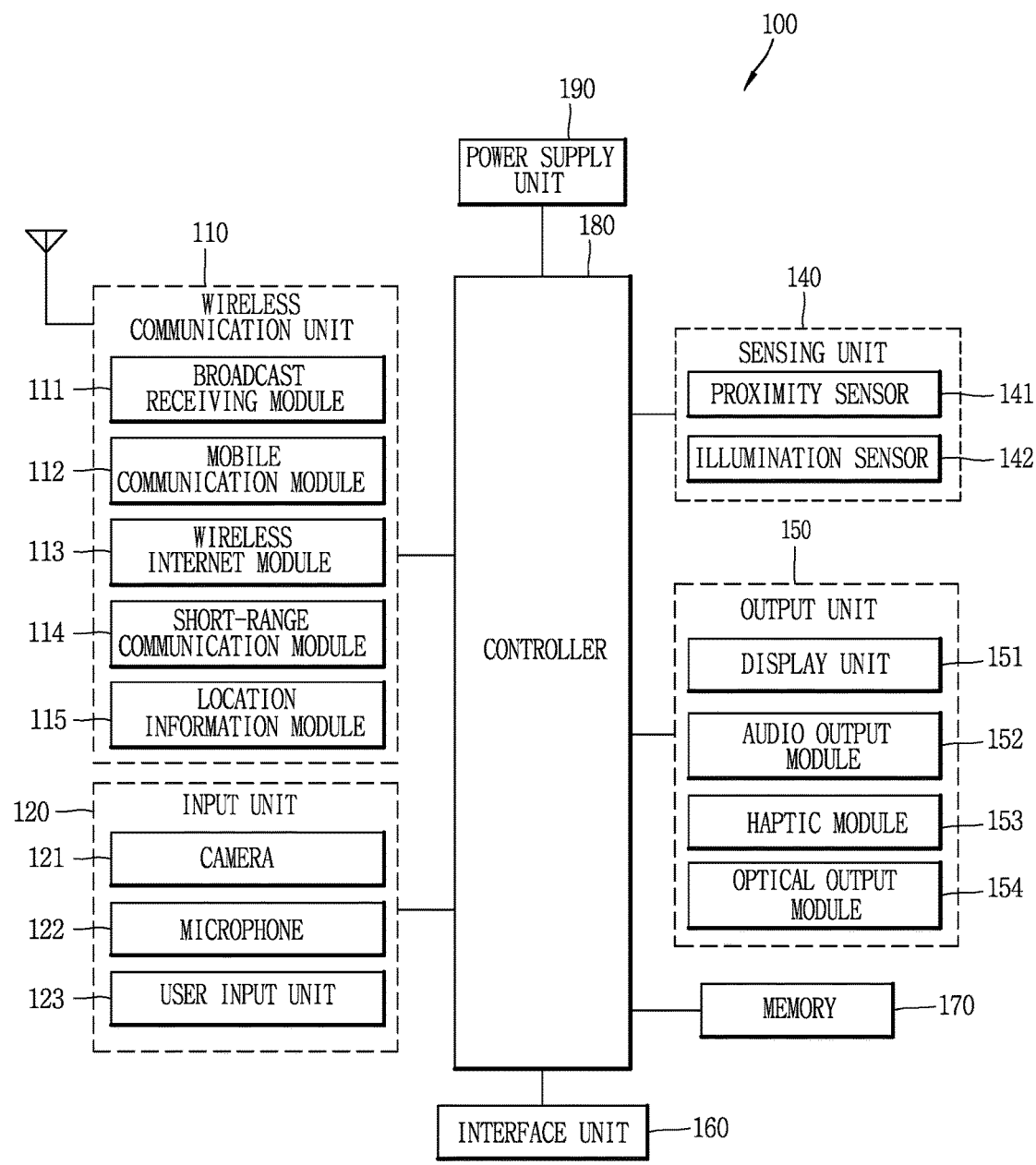
FIG. 1A is a block diagram of a mobile terminal in accordance with one embodiment of the present invention.
Figure 1B:
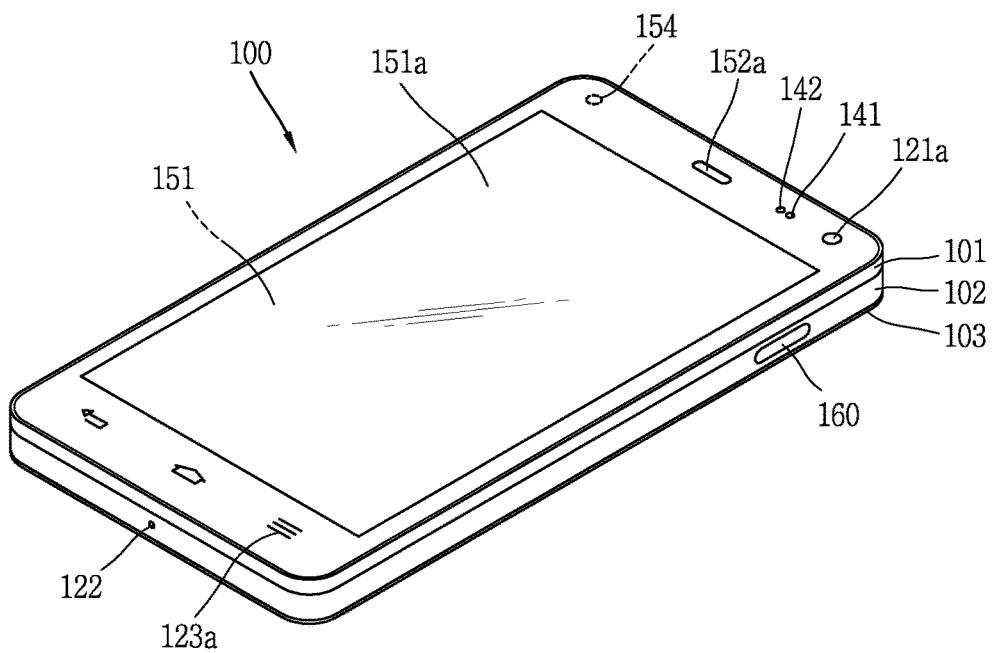
FIGS. 1B and 1C are conceptual views illustrating one example of a mobile terminal, viewed from different directions.
Figure 1C:
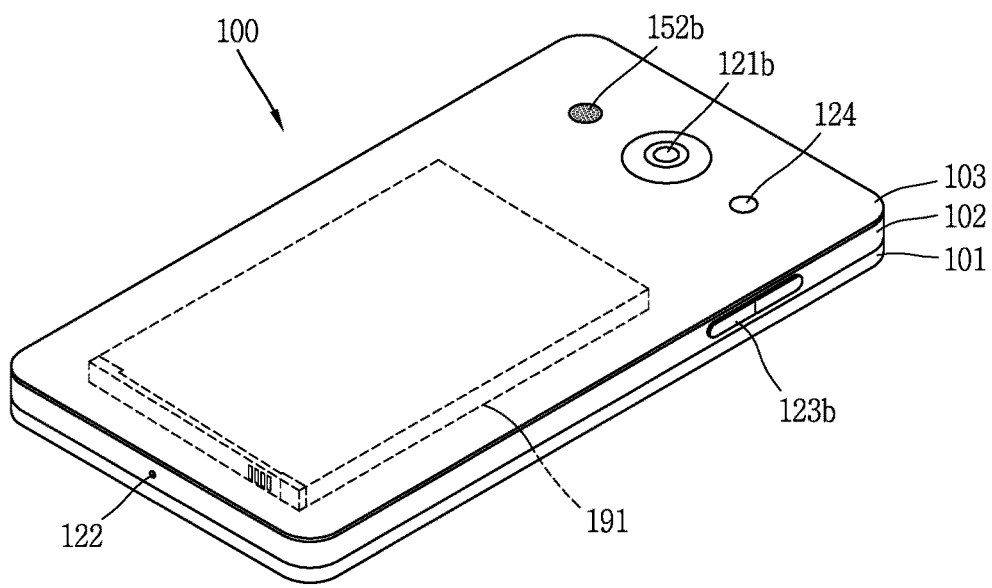

Referring to FIGS. 1A to 1C, FIG. 1A is a block diagram of a mobile terminal in accordance with one embodiment of the present invention, and FIGS. 1B and 1C are conceptual views illustrating one example of a mobile terminal, viewed from different directions. The mobile terminal 100 is shown having components such as a wireless communication unit 110, an input unit 120, a sensing unit 140, an output unit 150, an interface unit 160, a memory 170, a controller 180, and a power supply unit 190. Implementing all of the illustrated components is not a requirement, and that greater or fewer components may alternatively be implemented.

In more detail, the wireless communication unit 110 may typically include one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 may typically include one or more modules which connect the mobile terminal 100 to one or more networks.

The wireless communication unit 110 may include one or more of a broadcast receiving module 111, a mobile communication module 112, a wireless Internet module 113, a short-range communication module 114, and a location information module 115. The input unit 120 may include a camera 121 or an image input unit for obtaining images or video, a microphone 122, which is one type of audio input device for inputting an audio signal, and a user input unit 123 (for example, a touch key, a mechanical key, and the like) for allowing a user to input information. Data (for example, audio, video, image, and the like) may be obtained by the input unit 120 and may be analyzed and processed according to user commands.

The sensing unit 140 may typically be implemented using one or more sensors configured to sense internal information of the mobile terminal, the surrounding environment of the mobile terminal, user information, and the like. For example, the sensing unit 140 may include at least one of a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like). The mobile terminal disclosed herein may be configured to utilize information obtained from one or more sensors of the sensing unit 140, and combinations thereof.

The output unit 150 may typically be configured to output various types of information, such as audio, video, tactile output, and the like. The output unit 150 may be shown having at least one of a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 can provide or process information or functions appropriate for a user by processing signals, data, information and the like, which are input or output by the aforementioned various components, or activating application programs stored in the memory 170.

Also, the controller 180 controls some or all of the components illustrated in FIG. 1A according to the execution of an application program that have been stored in the memory 170. In addition, the controller 180 can control at least two of those components included in the mobile terminal to activate the application program.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least part of the components may cooperatively operate to implement an operation, a control or a control method of a mobile terminal according to various embodiments disclosed herein. Also, the operation, the control or the control method of the mobile terminal may be implemented on the mobile terminal by an activation of at least one application program stored in the memory 170.

Hereinafter, description will be given in more detail of the aforementioned components with reference to FIG. 1A, prior to describing various embodiments implemented through the mobile terminal 100. First, regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), Wideband CDMA (WCDMA), High Speed Downlink Packet access (HSDPA), High Speed Uplink Packet Access (HSUPA), Long Term Evolution (LTE), LTE-advanced (LTE-A) and the like). Examples of the wireless signals include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), High Speed Uplink Packet Access (HSUPA), Long Term Evolution (LTE), LTE-advanced (LTE-A) and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LET-A, and the like, as part of a mobile communication network, the wireless Internet module 113 performs such wireless Internet access and may be understood as a type of the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

Here, another mobile terminal (which may be configured similarly to mobile terminal 100) may be a wearable device, for example, a smart watch, a smart glass or a head mounted display (HMD), which can exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of at least part of data processed in the mobile terminal 100 to the wearable device via the short-range communication module 114. Hence, a user of the wearable device may use the data processed in the mobile terminal 100 on the wearable device. For example, when a call is received in the mobile terminal 100, the user can answer the call using the wearable device. Also, when a message is received in the mobile terminal 100, the user can check the received message using the wearable device.

The location information module 115 is generally configured to detect, calculate, derive or otherwise identify a position (or current position) of the mobile terminal. As an example, the location information module 115 includes a Global Position System (GPS) module, a Wi-Fi module, or both. For example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module. If desired, the location information module 115 may alternatively or additionally function with any of the other modules of the wireless communication unit 110 to obtain data related to the position of the mobile terminal. The location information module 115 is a module used for acquiring the position (or the current position) and may not be limited to a module for directly calculating or acquiring the position of the mobile terminal.

The input unit 120 may be configured to permit various types of inputs to the mobile terminal 120. Examples of such inputs include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In addition, the cameras 121 may be arranged in a matrix configuration to permit a plurality of images having various angles or focal points to be input to the mobile terminal 100. Also, the cameras 121 may be located in a stereoscopic arrangement to acquire left and right images for implementing a stereoscopic image.

The microphone 122 processes an external audio signal into electric audio (sound) data. The processed audio data can be processed in various manners according to a function being executed in the mobile terminal 100. If desired, the microphone 122 may include assorted noise removing algorithms to remove unwanted noise generated in the course of receiving the external audio signal.

The user input unit 123 is a component that permits input by a user. Such user input may enable the controller 180 to control operation of the mobile terminal 100. The user input unit 123 may include one or more of a mechanical input element (for example, a mechanical key, a button located on a front and/or rear surface or a side surface of the mobile terminal 100, a dome switch, a jog wheel, a jog switch, and the like), or a touch-sensitive input element, among others. As one example, the touch-sensitive input element may be a virtual key, a soft key or a visual key, which is displayed on a touch screen through software processing, or a touch key which is located on the mobile terminal at a location that is other than the touch screen. Further, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like, and generate a corresponding sensing signal. The controller 180 generally cooperates with the sending unit 140 to control operation of the mobile terminal 100 or execute data processing, a function or an operation associated with an application program installed in the mobile terminal based on the sensing signal. The sensing unit 140 may be implemented using any of a variety of sensors, some of which will now be described in more detail.

The proximity sensor 141 refers to a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this instance, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like). In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data (or information) according to whether a touch with respect to a point on the touch screen is either a proximity touch or a contact touch.

A touch sensor can sense a touch (or a touch input) applied to the touch screen, such as display unit 151, using any of a variety of touch methods. Examples of such touch methods include a resistive type, a capacitive type, an infrared type, and a magnetic field type, among others. As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 can sense which region of the display unit 151 has been touched. Here, the touch controller may be a component separate from the controller 180, the controller 180, and combinations thereof.

In addition, the controller 180 can execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize location information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121, which has been depicted as a component of the input unit 120, typically includes at least one a camera sensor (CCD, CMOS etc.), a photo sensor (or image sensors), and a laser sensor. Implementing the camera 121 with a laser sensor may allow detection of a touch of a physical object with respect to a 3D stereoscopic image. The photo sensor may be laminated on, or overlapped by, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain location information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

Also, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented so the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a flash memory type, a hard disk type, a solid state disk (SSD) type, a silicon disk drive (SDD) type, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 can typically control operations relating to application programs and the general operations of the mobile terminal 100. For example, the controller 180 can set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected. As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance. Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101. In some embodiments, electronic components may also be mounted to the rear case 102. Examples of such electronic components include a detachable battery, an identification module, a memory card, and the like. A rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like. As an alternative to the example in which the plurality of cases form an inner space for accommodating components, the mobile terminal 100 may be configured such that one case forms the inner space. In this example, a mobile terminal 100 having a uni-body is formed so synthetic resin or metal extends from a side surface to a rear surface.

If desired, the mobile terminal 100 may include a waterproofing unit for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal 100 may include a display unit 151, first and second audio output module 152a and 152b, a proximity sensor 141, an illumination sensor 142, an optical output module 154, first and second cameras 121a and 121b, first and second manipulation units 123a and 123b, a microphone 122, an interface unit 160, and the like.

Hereinafter, as illustrated in FIGS. 1B and 1C, description will be given of the exemplary mobile terminal 100 in which the front surface of the terminal body is shown having the display unit 151, the first audio output module 152a, the proximity sensor 141, the illumination sensor 142, the optical output module 154, the first camera 121a, and the first manipulation unit 123a, the side surface of the terminal body is shown having the second manipulation unit 123b, the microphone 122, and the interface unit 160, and the rear surface of the terminal body is shown having the second audio output module 152b and the second camera 121b.

However, those components are not limited to the arrangement. Some components may be omitted or rearranged or located on different surfaces. For example, the first manipulation unit 123a may be located on another surface of the terminal body, and the second audio output module 152b may be located on the side surface of the terminal body other than the rear surface of the terminal body.

The display unit 151 outputs information processed in the mobile terminal 100. For example, the display unit 151 may display execution screen information of an application program executing at the mobile terminal 100 or user interface (UI) and graphic user interface (GUI) information in response to the execution screen information.

The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a receiver for transferring call sounds to a user's ear and the second audio output module 152b may be implemented in the form of a loud speaker to output alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this instance, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule alarm, an email reception, information reception through an application, and the like. When a user has checked a generated event, the controller 180 can control the optical output module 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a push (or mechanical) key, a touch key, and combinations thereof. Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

When the rear input unit is provided on the rear surface of the terminal body, a new type of user interface using this can be implemented. Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

A flash 124 is shown adjacent to the second camera 121b. When an image of a subject is captured with the camera 121b, the flash 124 may illuminate the subject. The second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 (see FIG. 1A) may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

In recent time, with development of digital technologies, user lives are generally digitalized. For example, for a digital door lock, a door can be controlled to be open or closed based on information input through an input element provided at the digital door lock. As such, home appliances or Internet sites increasingly require entering security information or personal information. Accordingly, an amount of personal information or security information (e.g., a password) that a user has to remember is gradually increasing.

Therefore, one embodiment of the present invention is to provide a mobile terminal and corresponding method for providing security information or personal information to a user even though the user does not remember such information. In the present invention, "security information" or "personal information" will commonly be referred to as "security-set information."

In addition, security-set information corresponds to information input by a user or information transmitted from at least one external device or external server. For example, a password of a door lock can be input on a terminal by a user, and the controller can secure the password information (process the password information into security information).

Here, 'securing' refers to converting (switching) general information into security-set information such that the general information cannot be output without an authentication process for outputting it on a terminal. The authentication process is performed to output security-set information. The security-set information is output on the terminal when the authentication process is completed, namely, the authentication has been successfully done. The authentication process can be performed by one of various authentication methods, which will be explained later.

In addition, a process of selecting (setting or processing) specific information as security-set information can be performed in various manners, and different variation embodiments may be present for each of graphic interfaces provided by individual terminals, so detailed description thereof will be omitted. This specification is described on the assumption that security-set information has already been provided (present).

Figure 2:
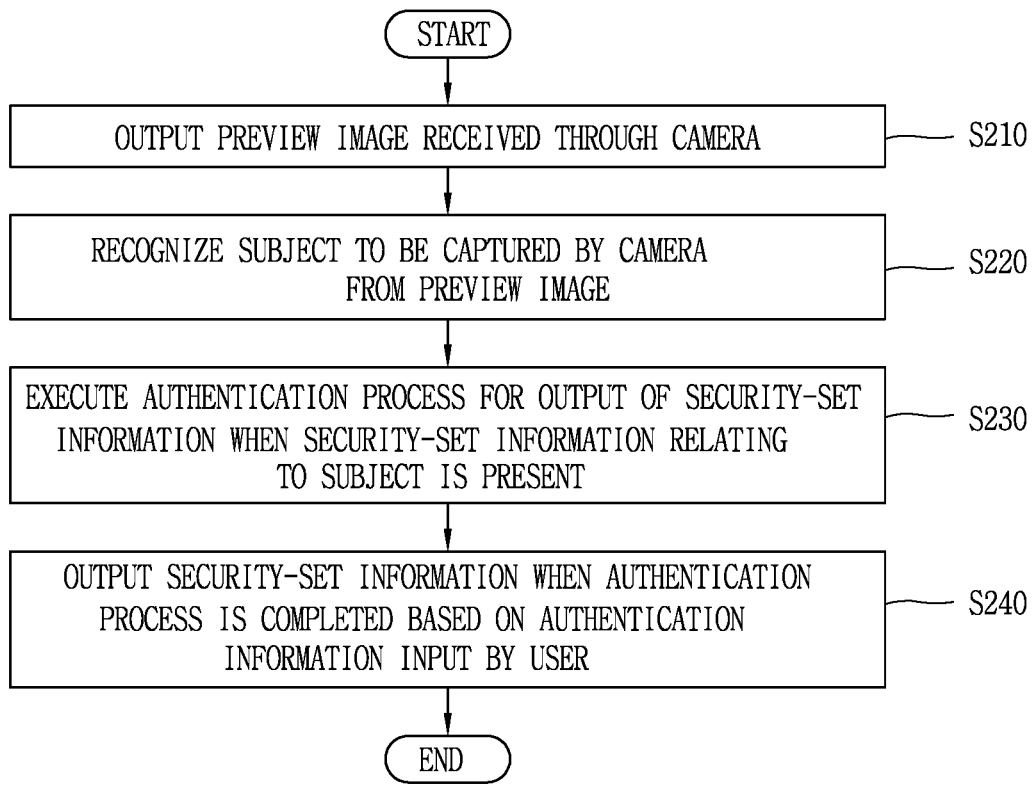
FIG. 2 is a flowchart illustrating a control method in accordance with one embodiment of the present invention.
Figure 3:
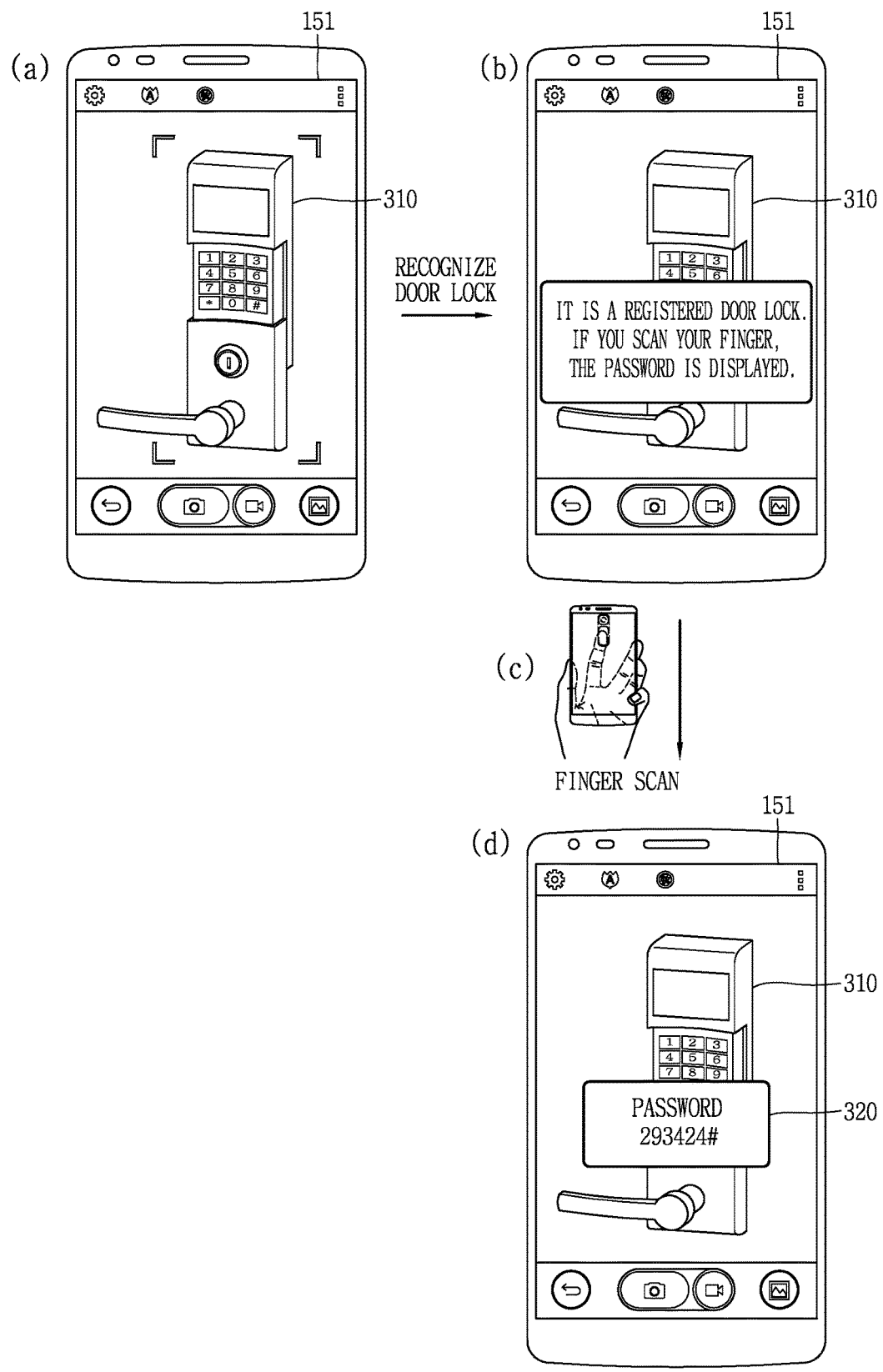
FIG. 3 is a conceptual view illustrating the control method of FIG. 2.

Hereinafter, description will be given in more detail of a method of providing security-set information to a user while maintaining security, with reference to the accompanying drawings. In particular, FIG. 2 is a flowchart illustrating a control method in accordance with one embodiment of the present invention, and FIG. 3 is a conceptual view illustrating the control method of FIG. 2.

The mobile terminal according to an embodiment of the present invention can recognize a subject (or an object) to be captured through an image (or a preview image) received from the camera 121 provided at the terminal, and provide security information related to the subject.

In more detail, in the mobile terminal according to an embodiment of the present invention, the controller 180 outputs a preview image received from the camera 121 (S210). For example, as illustrated in (a) of FIG. 3, a preview image is output on a touch screen 151. Here, the preview image refers to an image before storing an image received from the camera 121 in the memory 170. That is, the preview image is output before capturing the image received through the camera 121. In addition, the preview image may also be stored in the memory 170, but is stored merely in a temporary manner.

In addition, the controller 180 recognizes a subject (object), which is to be captured by the camera 121, from the preview image (or the image) (S220). The subject (object) to be captured by the camera corresponds to a graphic object included in the image received through the camera. That is, the preview image received through the camera includes a graphic object 310 corresponding to the subject (e.g., an image corresponding to a door lock).

Thus, the controller 180 can recognize the subject through the graphic object 310 included in the preview image. Further, when a plurality of subjects are recognized from the image, the controller 180 can decide a graphic object corresponding to a target, on which security-set information is provided, among the plurality of graphic objects included in the preview image, based on an area that the graphic object included in the preview image occupies on the image, based on a user selection, etc.

The controller 180 can also decide a graphic object (or subject) which is the target on which the security-set information is provided, in response to a touch applied to one of the plurality of graphic objects. Further, the controller 180 can provide security-set information related to a graphic object, which occupies the greatest area of the preview image, among the plurality of graphic objects.

In addition, recognition of the subject can refer to that i) a graphic object 310 corresponding to the subject has been distinguished on the image, and ii) even an attribute of the subject has been recognized (searched, identified, etc.) from the preview image as well as the distinguished graphic object 310 corresponding to the subject.

Further, 'attribute of the subject' includes information related to at least one of a type of the subject and a usage of the subject. In addition, as aforementioned, after the subject is recognized from the preview image, if there is security-set information related to the subject, the controller 180 executes an authentication process for outputting the security-setting information (S230).

Further, 'the presence of the security-set information related to the subject' refers to the security-set information corresponding to the subject being present in the memory 170 or an external server. The memory 170 or the external server may include an image corresponding to the subject and security-set information corresponding to the image in a matching manner. The image and the security-set information on the image is referred to as matching information.

In addition, the matching information refers to information that an image corresponding to each of at least one subject is linked (associated) with security-set information corresponding to each of the at least one subject. For example, the matching information may include a first image corresponding to a first subject and first security-set information corresponding to the first image. Also, the matching information may include a second image corresponding to a second subject, which is different from the first subject, and second security-set information corresponding to the second image.

In addition, when the subject is recognized from the preview image, the controller 180 determines whether an image and security-set information both corresponding to the recognized subject are included in the matching information stored in the memory, and performs the authentication process for outputting the security-set information based on the determination result. For example, as illustrated in (b) of FIG. 3, when the security-set information related to the recognized subject is included and thus the authentication process is performed, the controller 180 can output guide information notifying that the security-set information can be output. For example, the controller 180 can output the guide information, such as "It is a registered door lock. If you scan your fingerprint, the password is displayed." Accordingly, the user can be guided to perform the authentication process.

Therefore, the guide information includes induction information to induce the user to input authentication information which is needed to output the security-set information. Further, the authentication process is performed to output the security-set information. That is, the controller 180 can output the security-set information only when the authentication process is completed, namely, the authentication has successfully been done. The authentication process can also be performed by one of various authentication methods, which will be explained later.

In addition, after the authentication process is performed (S230), and when the authentication process is completed based on authentication information input by the user, the controller 180 outputs the security-set information in the mobile terminal (S240).

Further, the controller 180 can determine whether or not the user-input authentication information is equal to (or matches) pre-stored authentication information. If the input authentication information is equal to the pre-stored authentication information, the controller 180 can output the security-set information.

For example, as illustrated in (c) of FIG. 3, the authentication process is performed through a finger scan. When a fingerprint which has been preset to be accessible to the security-set information is recognized through a finger scan sensor provided at the terminal, the controller 180 can output security-set information 320, as illustrated in (d) of FIG. 3.

Further, the security-set information 320, as illustrated, may visually be output on the touch screen 151. In addition to this output method, the security-set information may also audibly be output through the audio output module 152.

As described above, the mobile terminal according to an embodiment of the present invention can recognize a subject from a preview image received through a camera and provide security-set information relating to the subject through a predetermined authentication process. Therefore, a user can obtain the security-set information relating to the subject even without remembering such security-set information in detail.

Hereinafter, description will be given in more detail of the function illustrated in FIGS. 2 and 3, namely, a method of accessing a function providing security-set information relating to a subject recognized from a preview image received through a camera, with reference to the accompanying drawings. In particular, FIGS. 4A to 4D are conceptual views illustrating a method of activating a camera in a mobile terminal for accessing security-set information in accordance with an embodiment of the present invention.

As discussed above, the mobile terminal can recognize a subject using a preview image received through a camera, and provide security-set information relating to the recognized subject. That is, in order to perform the aforementioned function, the camera has to be activated. Therefore, the mobile terminal according to an embodiment of the present invention can additionally provide the function on an application corresponding to an image capturing function.

For example, when an image capturing application or a camera application installed on the terminal is executed, the controller 180 can activate a camera and receive an image signal through the activated camera. An image corresponding to the image signal can also be output on the touch screen 151. When there is security-set information related to a subject corresponding to a graphic object included in the received image, then the controller 180 can output guide information (see (b) of FIG. 3) notifying the presence of the subject.

Also, the controller 180 can output an icon for notifying the presence of the security-set information relating to the subject, prior to outputting the guide information. When the icon is selected, the controller 180 can output the guide information to induce the user to perform an authentication process.

Also, after the image capturing application or the camera application is executed, and when a function associated with the output of the security-set information is selected by the user, the controller 180 can recognize the subject. The controller 180 can perform a process for outputting the security-set information relating to the recognized subject.

Thus, the function of providing the security-set information relating to the subject can be provided through the image capturing application. In addition, the image capturing application may be preinstalled when the mobile terminal is shipped. Alternatively, the image capturing application may be downloaded from an external server and installed on the mobile terminal.

Further, the function providing the security-set information relating to the subject may be provided through a separate application, from the image capturing application. The separate application may be preinstalled when the mobile terminal is shipped. Alternatively, the separate application may be downloaded from an external server and installed on the mobile terminal.

Hereinafter, description will be given in more detail of a method of providing security-related information relating to a subject through a separate application, with reference to the accompanying drawings. In addition, the mobile terminal according to an embodiment of the present invention can be configured such that an access to a function of providing security-set information relating to a subject recognized from an image captured by a camera is allowed even when the mobile terminal is in a lock state.

Figure 4A:
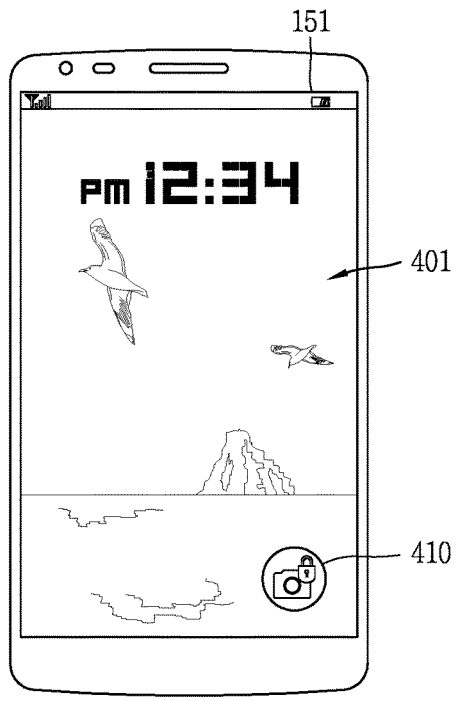
FIGS. 4A to 4D are conceptual views illustrating a method of activating a camera in a mobile terminal to access security-set information in accordance with an embodiment of the present invention.

For example, as illustrated in FIG. 4A, when the touch screen 151 is activated in a lock state of a mobile terminal, a lock screen 401 is output on the touch screen 151. A graphic object (or an icon) 410 is displayed on the lock screen 401 for activating a function providing security-set information relating to a subject which is recognized from an image captured by a camera.

That is, a user can select the icon 410 output on the lock screen 401 to execute a function associated with an output of the security-set information. Thus, the mobile terminal allows for an access to the function associated with the output of the security-set information directly on the lock screen, thereby enhancing user convenience. In addition, when the icon 410 is selected, the process described with reference to FIGS. 2 and 3 is executed.

Figure 4B:
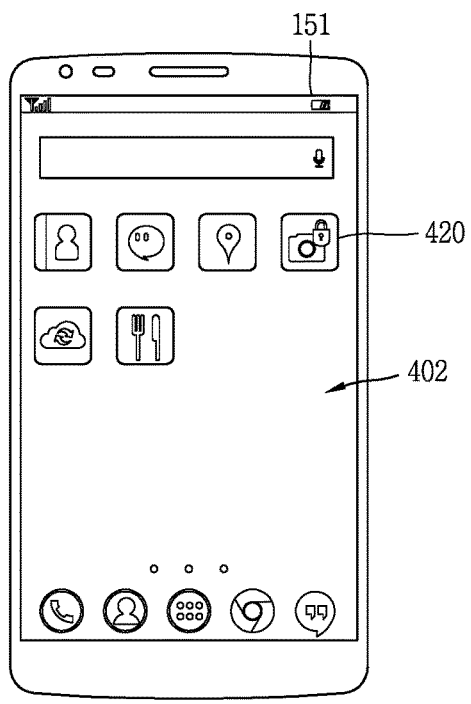

As another example, as illustrated in FIG. 4B, a graphic object (or an icon) 420 is displayed on a home screen page 402 for activating a function of providing security-set information relating to a subject which is recognized from an image captured by a camera. When the icon 420 is selected, the process described with reference to FIGS. 2 and 3 is executed.

Figure 4C:
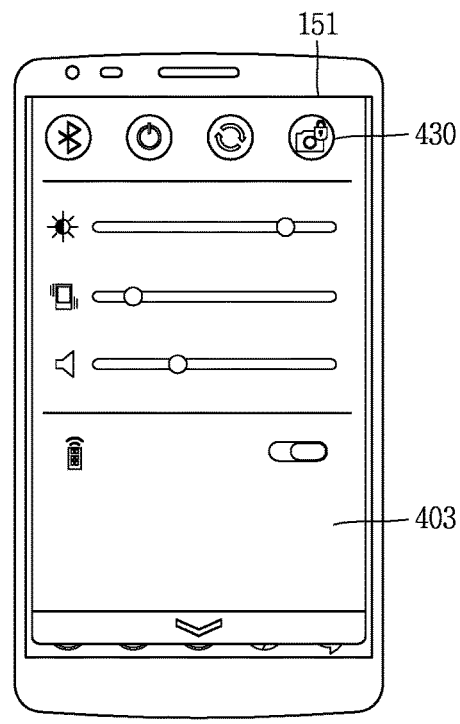

As another example, as illustrated in FIG. 4C, a graphic object (or an icon) 430 for activating a function of providing security-set information relating to a subject which is recognized from an image captured by a camera may be included on a state display window (a function control window, a curtain window, a control window or an indicator window) 403.

In more detail, the state display window 403 is output when a preset touch (e.g., a drag touch) having a preset direction is applied to a preset one edge of the touch screen 151. The thusly-output state display window 403 can be closed in response to a preset touch having an opposite direction to the preset direction.

Figure 4D:
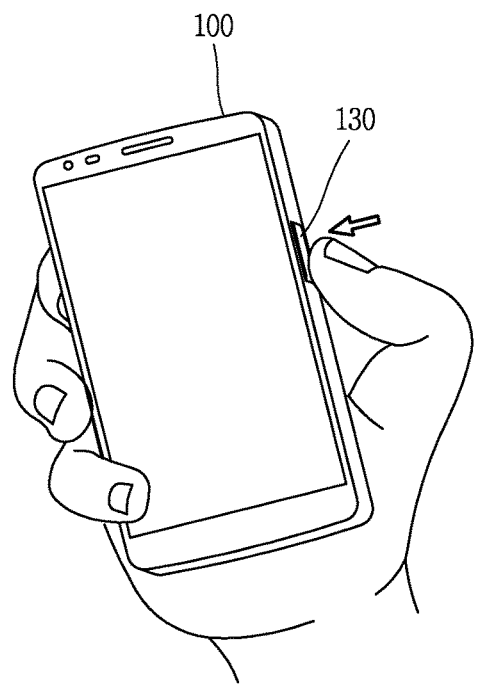

In addition, when the graphic object 430 included in the state display window 403 is selected, the state display window 403 disappears and the image received through the camera is output. Afterwards, the process described with reference to FIGS. 2 and 3 is executed. As another example, as illustrated in FIG. 4D, the controller 180 can perform the process described with reference to FIGS. 2 and 3 when a user input is applied to an input element 130 (e.g., a hardware key or a push key) provided on the terminal.

Further, the controller 180 can perform the process described with reference to FIGS. 2 and 3 in response to a user motion applied to the terminal as much as meeting a preset condition. As described above, the mobile terminal according to an embodiment of the present invention can provide a function of outputting security-set information using a camera in various manners.

Hereinafter, the authentication process in those processes described with reference to FIGS. 2 and 3 will be described in more detail with reference to the accompanying drawings. In particular, FIGS. 5A, 5B, 6A, 6B, 7, 8 and 9 are conceptual views illustrating a securing method in a mobile terminal according to an embodiment of the present invention.

As described above, a subject is recognized from an image (or a preview image) received through a camera, and an authentication process for outputting security-set information relating to the subject is executed when the security-set information is present.

There are several variation embodiments of the authentication process for outputting the security-set information. That is, the authentication process can be performed by one of various authentication methods. Any type of authentication method can be employed if it can authenticate a user who is permitted to access the security-set information.

As one example, the authentication process is performed by an authentication method corresponding to a finger scan method. Through the authentication process, the user who is permitted to access the security-set information can be authenticated. In this instance, the mobile terminal according to an embodiment of the present invention may further include a finger scan sensor to recognize a fingerprint of a finger contacting the mobile terminal.

Figure 5A:
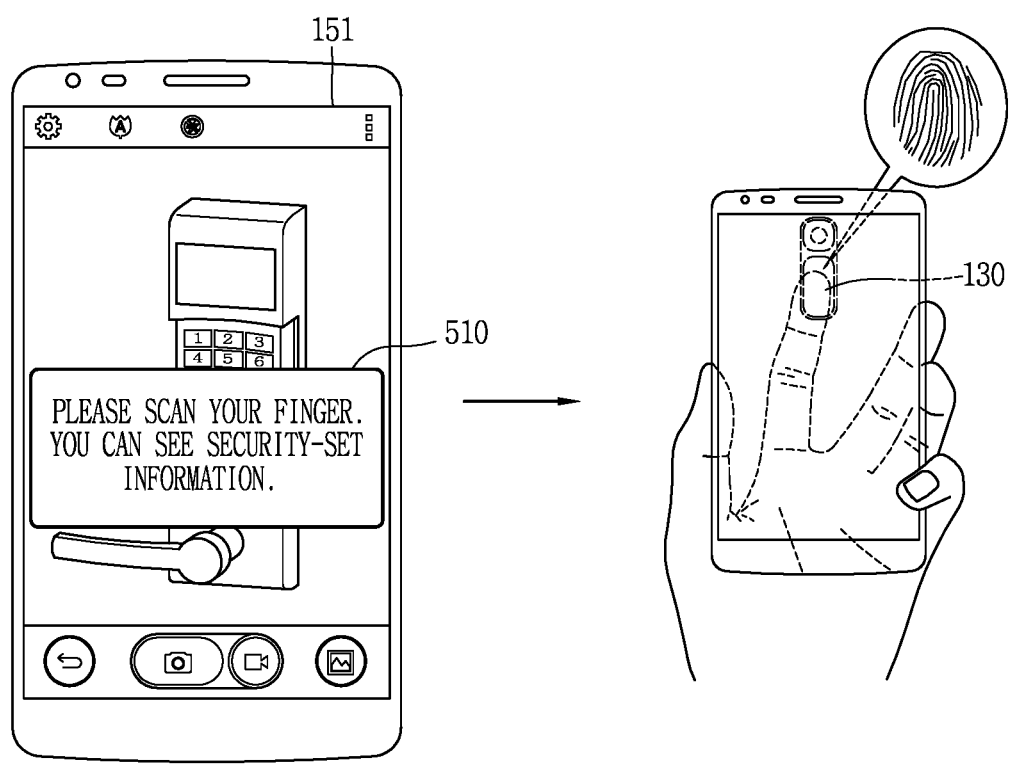
FIGS. 5A, 5B, 6A, 6B, 7, 8 and 9 are conceptual views illustrating a securing method in a mobile terminal in accordance with an embodiment of the present invention.

In more detail, the finger scan sensor, as illustrated in (a) and (b) of FIG. 5A, can be disposed on a user input unit 130 provided at the rear surface 103 of the terminal. The user input unit 130 can be configured as a touch sensor overlapped by the finger scan sensor. As another example, the user input unit 130 may be a push key (a hardware key or a physical key) that the finger scan sensor overlaps. After guide information 510 is output, when a fingerprint of a finger contacting the finger scan sensor is equal to (or corresponds to) fingerprint information on a user who is permitted to access the security-set information, the controller 180, as illustrated in (b) of FIG. 3, can output security-set information. In other words, the controller 180 can output the security-set information when the user's fingerprint scanned by the finger scan sensor corresponds to pre-stored fingerprint information on the user. In addition, the time points of outputting the guide information and scanning the fingerprint and the finger scan sensor are not limited to the aforementioned time points.

In another example, the finger scan sensor can be provided on the touch screen 151. For example, the finger scan sensor can be arranged to overlap at least part of the touch screen 151. Alternatively, the finger scan sensor may be provided within the touch screen 151. In this instance, the controller 180 can recognize the fingerprint of the user, who touches the touch screen 151, through the touch screen 151.

Figure 5B:
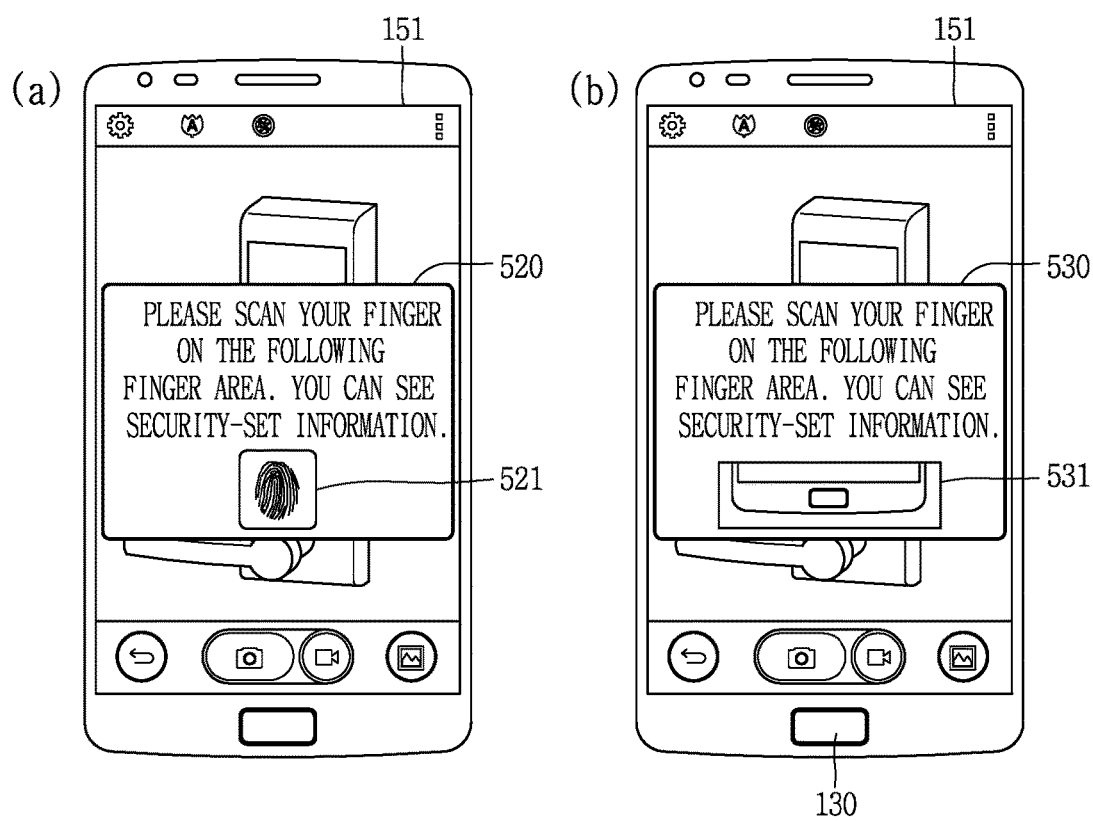

Further, the controller 180, as illustrated in (a) and (b) of FIG. 5B, can output a graphic object 521 notifying an area where the finger scan sensor is located. That is, the graphic object 521 allows the user to recognize which area the finger should touch for scanning the fingerprint. The graphic object 521 may be included in guide information 520 for inducing an access toward the security-set information.

In addition, when a fingerprint is scanned on another area, other than the area with the graphic object 521 output because the fingerprint scant sensor is disposed on the other area, the controller 180 does not use the scanned fingerprint information as authentication information. That is, the controller 180 can use the scanned fingerprint as the authentication information for performing the authentication process only when the fingerprint is scanned on a preset area. This is for checking whether the user surely intends to use the security-set information.

As another example, the finger scan sensor may be located at the front surface of the terminal. For example, the finger scan sensor, as illustrated in (b) of FIG. 5B, can be disposed on the user input unit 130 provided at the front surface of the terminal. The user input unit 130 may be called 'home key' and the home key may be configured as a touch sensor overlapped by the finger scan sensor. As another example, the home key may be a push key (a hardware key or a physical key) overlapped by the finger scan sensor. Also, the home key may be a push key on which both of the touch sensor and the finger scan sensor are disposed.

As illustrated in (b) of FIG. 5B, the controller 180 can also include indication information 531 related to a position, which the finger should contact for scanning the fingerprint, in the guide information 530 related to the security-set information. When the authentication process is performed through the fingerprint scan method, the controller 180 can output the security-set information only while the fingerprint of the user who is permitted to access the security-set information is scanned on the finger scan sensor. That is, in this instance, when the preset finger of the user is removed from the finger scan sensor, the output of the security-set information is stopped.

Further, when the authentication process is completed, the controller 180 can continuously output the security-set information, even though the preset finger of the user is released from the fingerprint sensor. In this instance, when a specific key (a hardware key or a touch key) corresponding to a cancel function is selected, the output of the security-set information can be stopped.

In addition, the authentication process can be performed based on authentication information input by the user in the mobile terminal according to an embodiment of the present invention. In more detail, the authentication information may be preset password information, pin code information and the like.

Figure 6A:
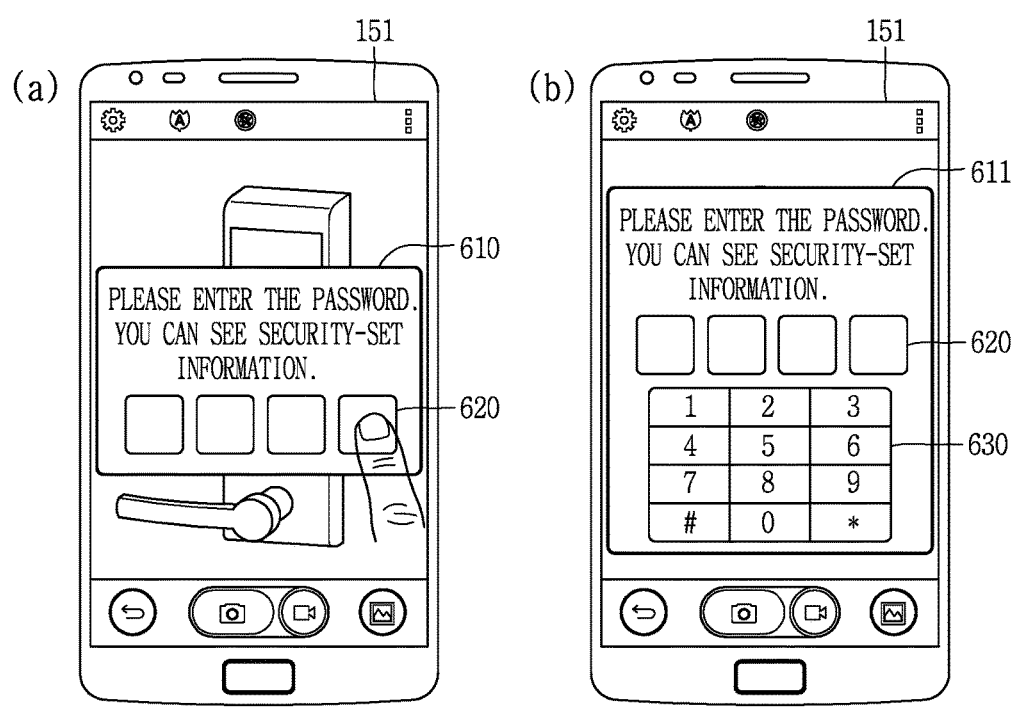

For example, as illustrated in (a) and (b) of FIG. 6A, when a subject with security-set information is recognized, the controller 180 can output guide information 610 for guiding an output of the security-set information. Further, the controller 180 can additionally output an input area 620 for the user to enter authentication information. Also, the controller 180 can additionally output a keypad 630 on the touch screen 151 such that the user can enter the authentication information. The password or pin code entered through the keypad 630 may be output on the input area 620.

Figure 6B:
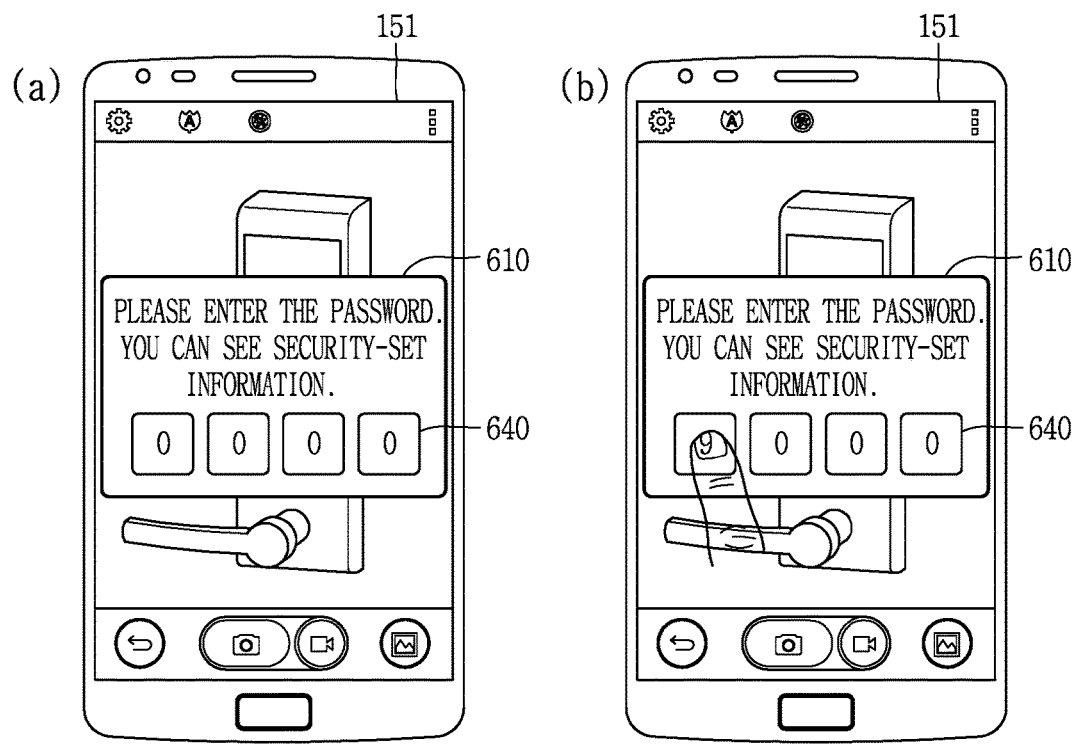

In addition, a password or pin code, as illustrated in (a) and (b) of FIG. 6B, can be input, in response to a touch applied to an input area 640. Arbitrary numbers or characters may initially be entered on the input area 640. The numbers or characters may change based on a touch applied to the input area 640. When the numbers entered on the input area 640 correspond to preset authentication information, the controller 180 can determine that the authentication process has successfully been completed.

Figure 7:
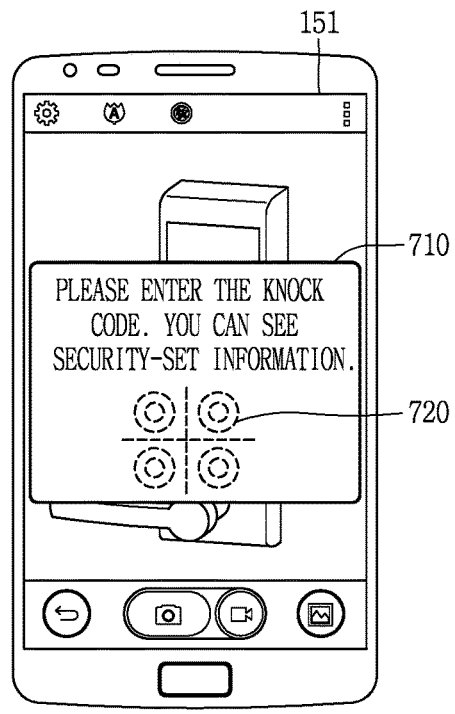

In another example, the authentication information can be configured as a touch pattern (or a knock code) defined by a plurality of tap touches. As illustrated in FIG. 7, when a preset touch pattern is applied to a touch area 720 of a guide 710 on which a touch pattern is entered, the controller 180 can determine that the authentication process has successfully been completed. The touch pattern may be defined by a number of touches or relative positions of continuous touches. The preset touch pattern may be identified (distinguished) based on a user-input touch.

Figure 8:
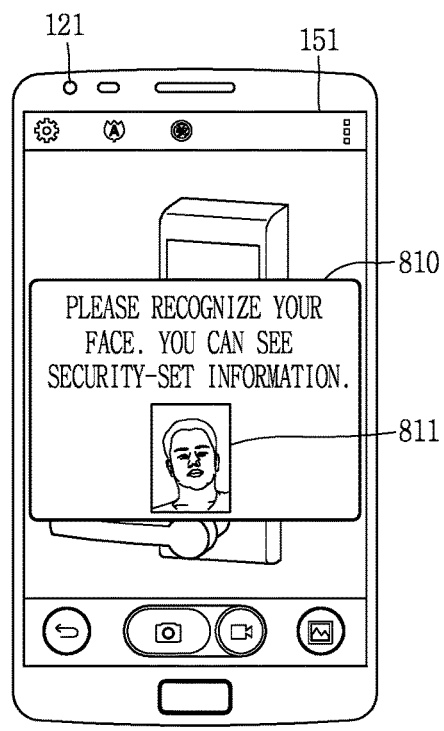

As another example, as illustrated in FIG. 8, the controller 180 can authenticate a user who is permitted to access security-set information through a face recognition. In this instance, a rear camera of the terminal can capture a subject, and a front camera 121 may capture the user. In this instance, a user's face image 811 recognized can be output on the touch screen 151. When the recognized user's face corresponds to the user who is permitted to access the security-set information, the controller 180, as described with reference to FIGS. 2 and 3, can output the security-set information. In addition to this, the present invention can employ various authentication methods, such as voice recognition, iris scanning, eye scanning, etc., to authenticate the user who is permitted to access the security-set information. A guide 810 is also displayed on the touch screen 151 to inform the user about the process of face recognition.

Figure 9:
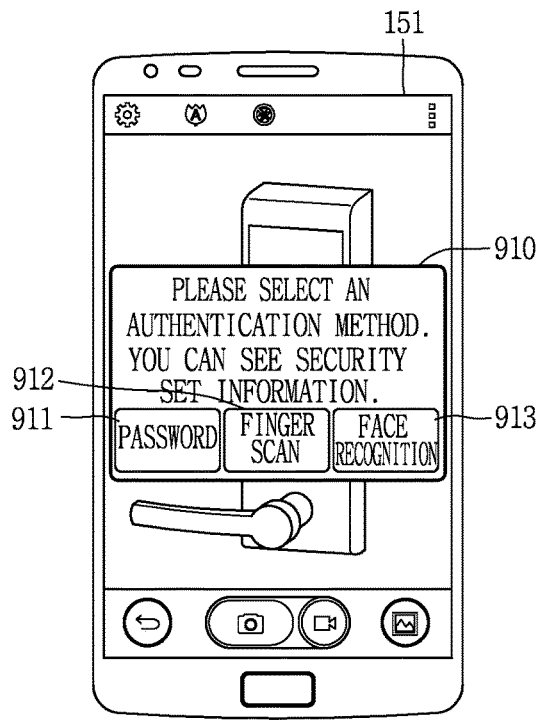

Decision of one of various authentication methods for authenticating a user permitted to access security-set information may depend on a user selection. In one example, as illustrated in FIG. 9, the mobile terminal outputs guide information 910 to induce the user to select an authentication method, prior to performing the authentication process. The guide information 910 may include a plurality of graphic objects 911, 912 and 913 corresponding to different authentication methods. The controller 180 can perform a different authentication process according to a selected graphic object from the plurality of graphic objects 911, 912 and 913. Each authentication method is in the foregoing description.

Figure 10:
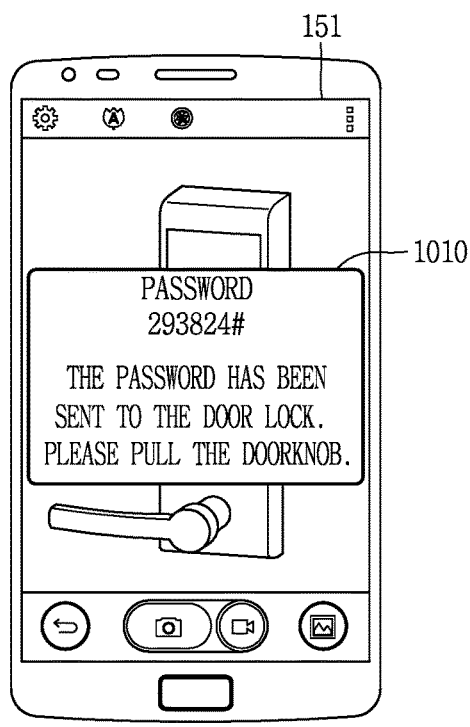
FIG. 10 is a conceptual view illustrating a method of transmitting security-set information to a subject to be captured, in a mobile terminal in accordance with an embodiment of the present invention.

Through the authentication method, the security-set information may be output on the terminal. In addition to outputting the security-set information on the terminal, the security-set information, as illustrated in FIG. 10, may also be sent to the subject. In particular, FIG. 10 is a conceptual view illustrating a method of transmitted security-set information to a subject in a mobile terminal according to an embodiment of the present invention.

That is, when the recognized subject can perform wireless communication with the terminal, the controller 180 can transmit the security-set information to the recognized subject through a wireless communication unit. In this instance, the user's inconvenience of directly inputting security-set information relating to the subject can be reduced. For example, when the subject is a door lock and the security-set information is a password of the door lock, the terminal can transmit the password to the subject. Therefore, the user's inconvenience of directly inputting the password of the door lock is reduced.

Hereinafter, a function associated with security-set information will be described in more detail with reference to the accompanying drawings. In particular, FIGS. 11A to 11C and 12A to 12B are conceptual views illustrating a method of performing a function associated with security-set information, in a mobile terminal in accordance with an embodiment of the present invention, and FIGS. 13A and 13B are conceptual views illustrating a method of sharing security-set information, in a mobile terminal in accordance with an embodiment of the present invention.

The mobile terminal according to an embodiment of the present invention can provide another additional function, in addition to the function of outputting security-set information related to a subject recognized from a preview image received through a camera. For example, the addition function may be changing security-set information or sharing security-set information with another terminal or an external server.

Figure 11A:
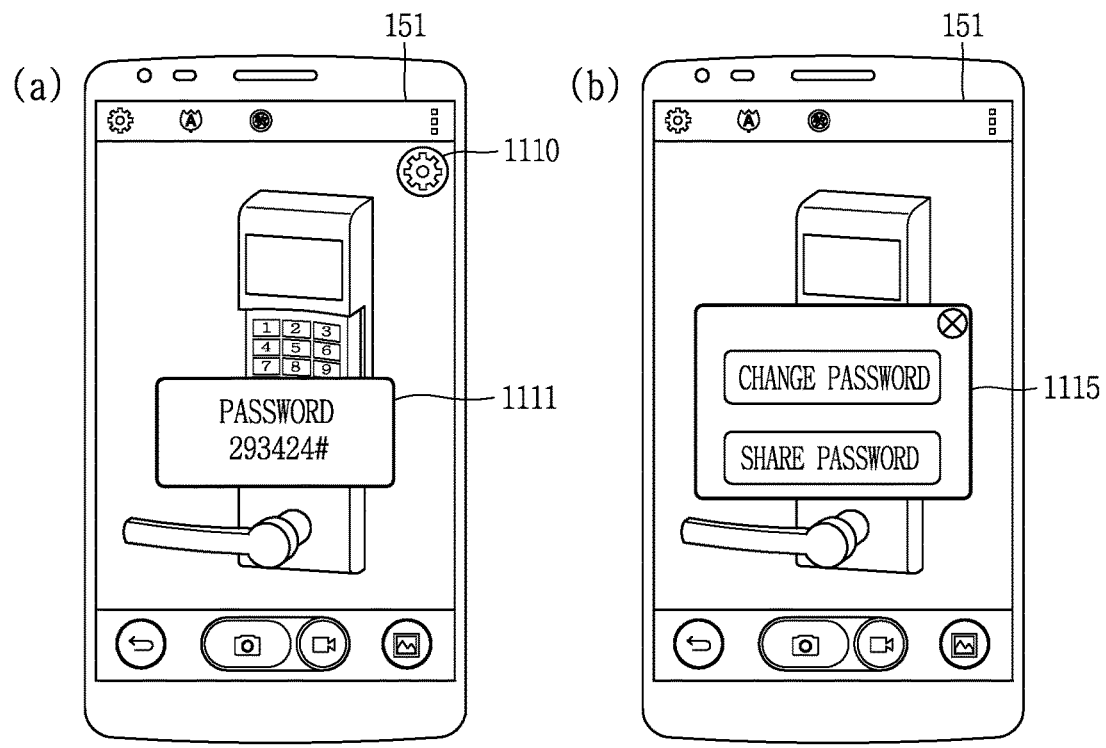
FIGS. 11A, 11B, 11C, 12A and 12B are conceptual views illustrating a method of performing a function associated (or linked) with security-set information, in a mobile terminal in accordance with an embodiment of the present invention.

For example, as illustrated in (a) of FIG. 11A, when security-set information 1111 is output after the completion of the authentication process, the controller 180 can output a graphic object (or an icon) 1110 associated with performing an additional function linked with the security-set information. When the graphic object 1110 is selected, the controller 180, as illustrated in (b) of FIG. 11A, can output a list 1115 including items (or graphic objects) corresponding to additional functions, respectively.

For example, the additional functions include changing security-set information, and sharing security-set information with another user. In addition, the additional function may be performed without an authentication process because it is performed after the authentication process for outputting the security-set information has been completed.

Thus, an interface for entering an additional function (e.g., the output of the graphic object 1110 for entering the additional function), as illustrated in FIG. 11A, can be provided simultaneously when or after the security-set information is output in response to the completion of the authentication process.

Figure 11B:
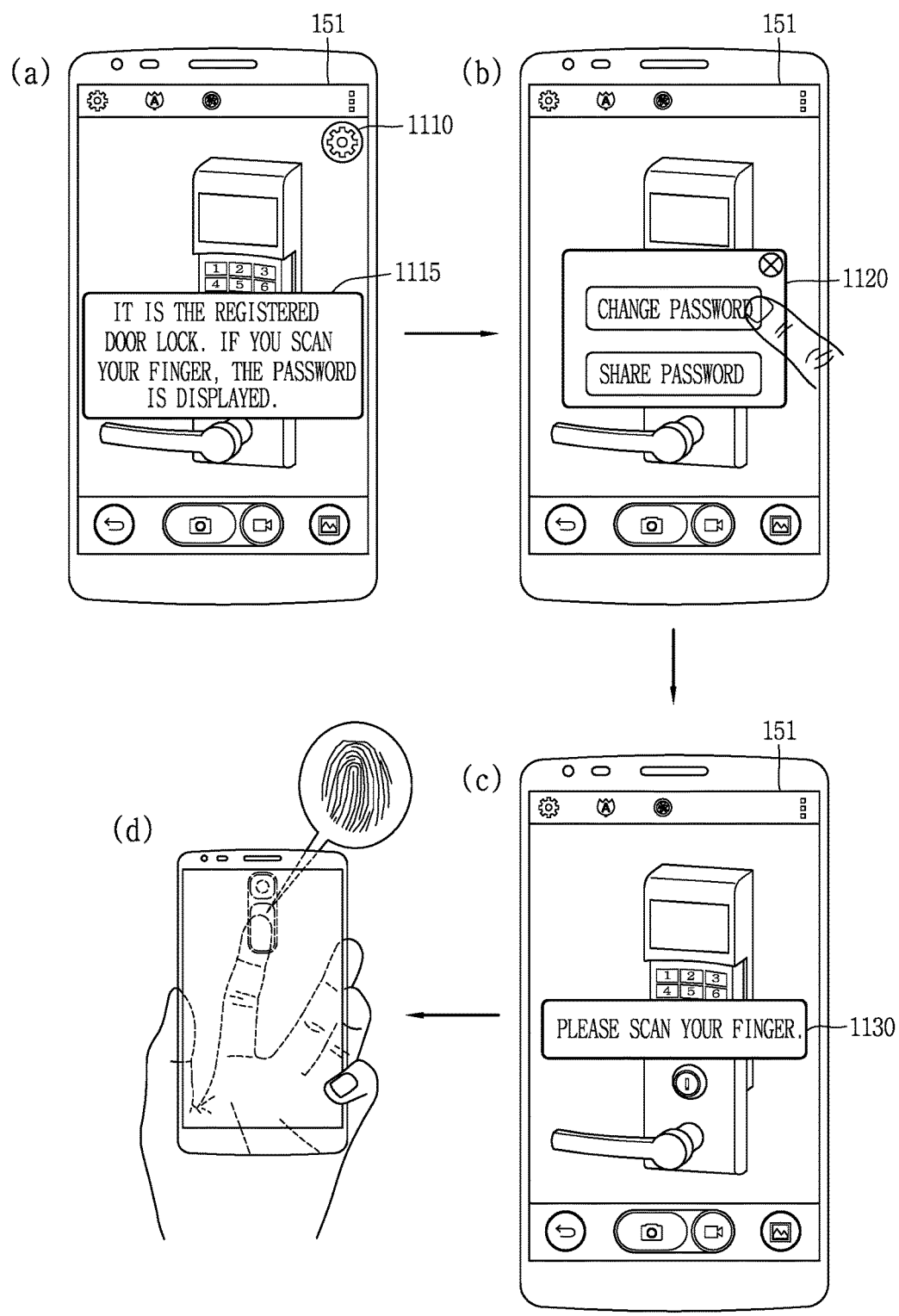

The interface for entering the additional function, as illustrated in (a) of FIG. 11B, can be provided even before the security-set information is output. For example, the graphic object (or the icon) 1110 associated with the performing of the additional function linked with the security set information can be output along with guide information 1115 notifying the presence of the security-set information.

In this instance, when the graphic object 1110 is selected, as illustrated in (b) of FIG. 11B, items (or graphic objects) corresponding to additional functions, respectively, can be output. When one of the items corresponding to the additional functions is selected, the authentication process can be performed according to a type of the selected function. For example, as illustrated in (b) of FIG. 11B, when the function of changing the security-set information is selected, the controller 180 can perform the authentication process, as illustrated in (c) and (d) of FIG. 11B.

Figure 11C:
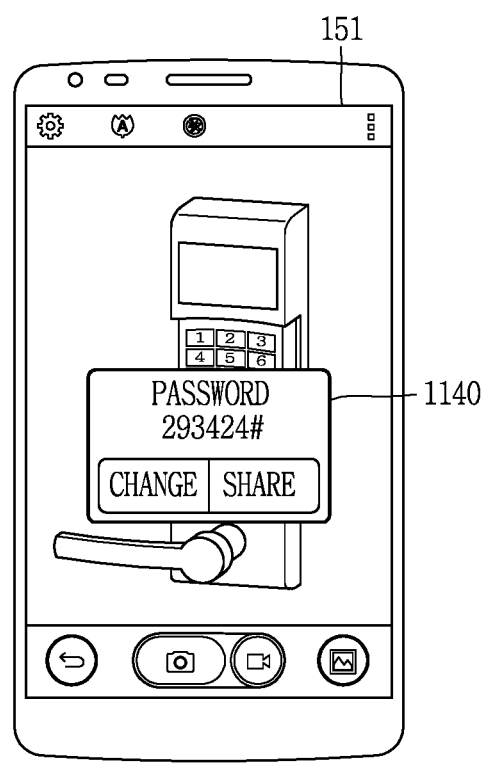

In addition, as illustrated in FIG. 11C, items corresponding to the additional functions can be output along with security-set information 1140. Therefore, the user can directly enter the additional function simultaneously with receiving the security-set information 1140.

Figure 12A:
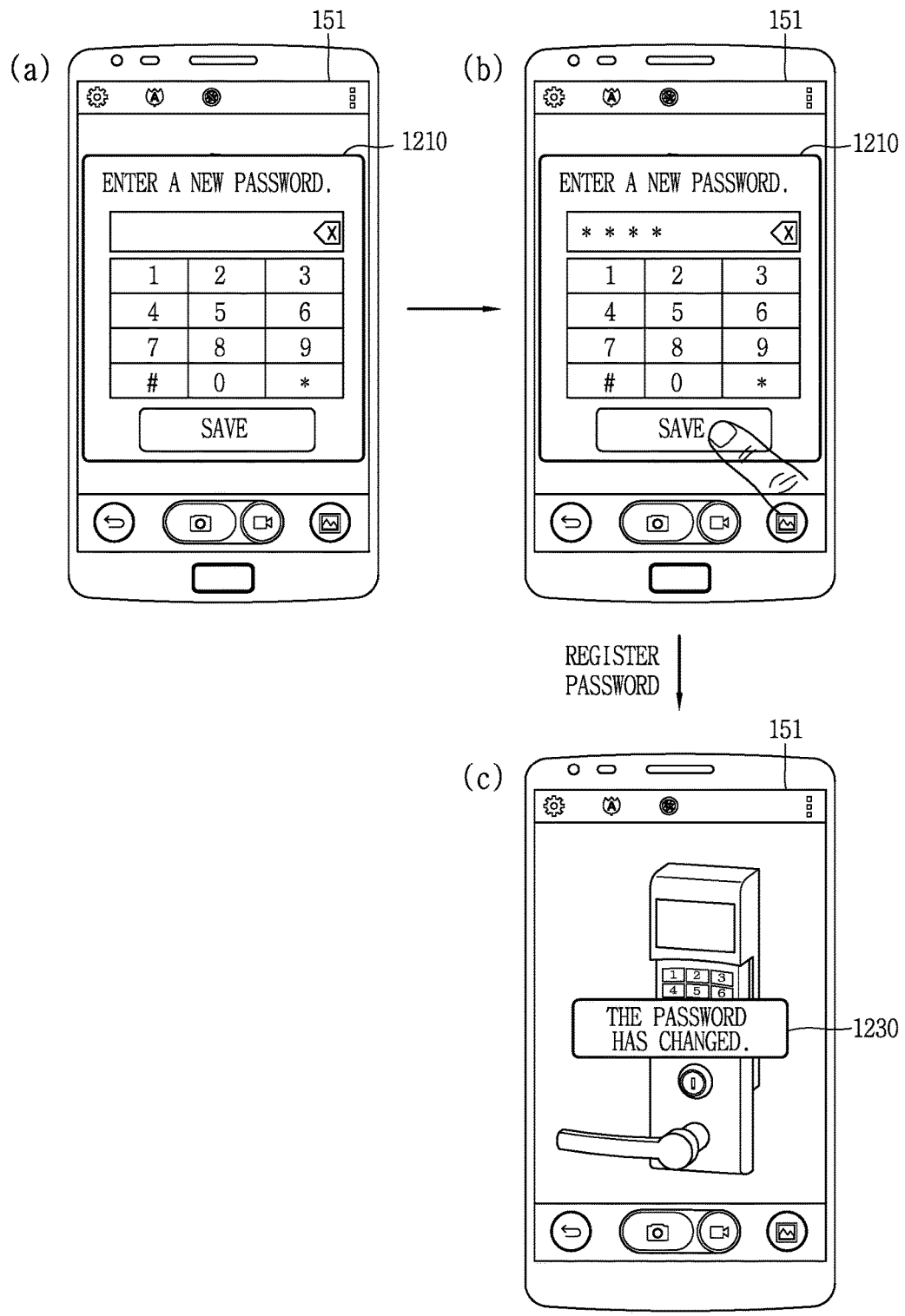
Figure 13A:
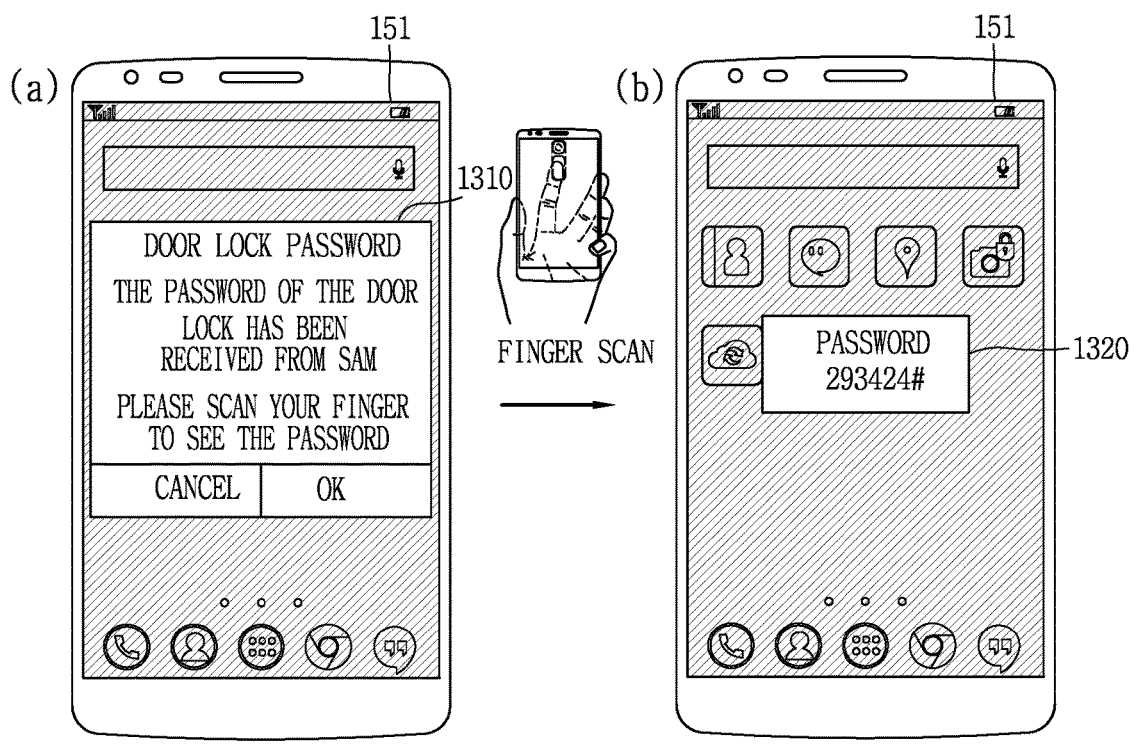
FIGS. 13A and 13B are conceptual views illustrating a method of sharing security-set information, in a mobile terminal in accordance with an embodiment of the present invention.
Figure 13B:
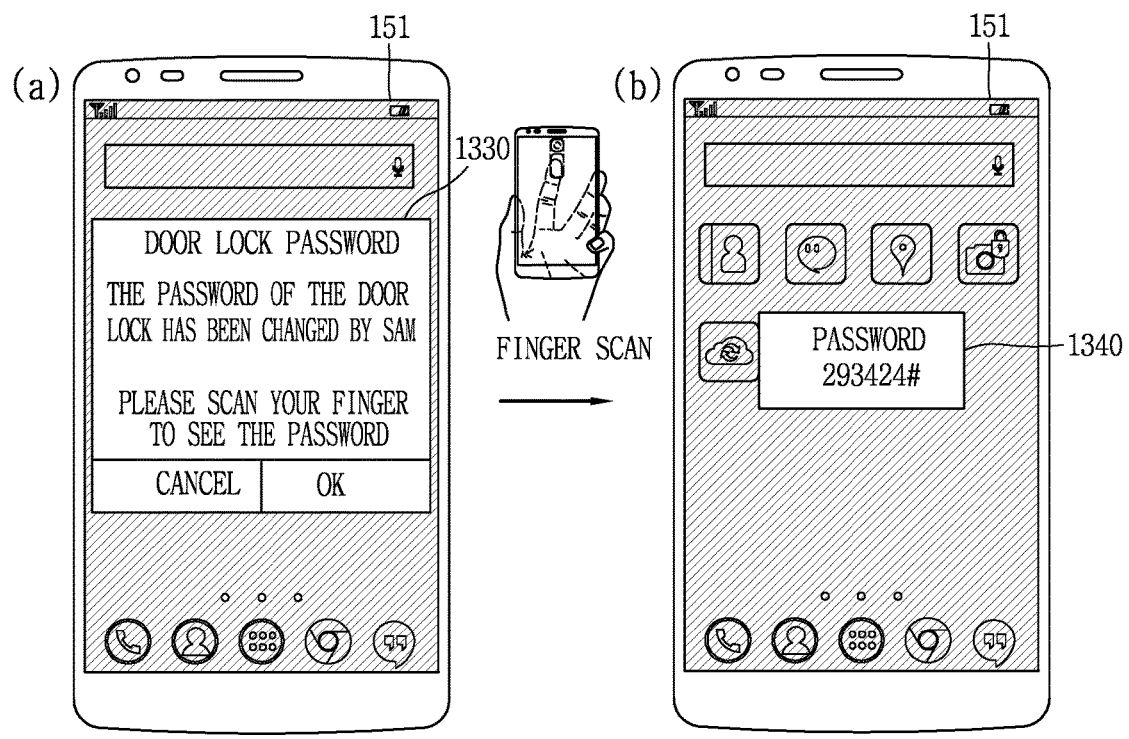

Further, when the password changing function is selected through the aforementioned methods, as illustrated in (a) of FIG. 12A, the controller 180 can output a setting screen 1210 for a user to enter new security information (or a new password). As illustrated in (b) of FIG. 12A, when the new security information is entered by the user in the setting screen 1210, the newly-entered security information, as illustrated in (c) of FIG. 12A, can be stored as security-set information in association with the subject. In this instance, matching information related to the subject may change. That is, security-set information associated with an image corresponding to the subject included in matching information may be changed into the newly-entered security information.

Thus, when the security-set information changes, the controller 180 can transmit the changed security-set information to the subject (or an electronic device corresponding to the subject). In this instance, the electronic device corresponding to the subject may change preset security-set information based on the changed security-set information received from the terminal.

Further, as illustrated in (b) of FIG. 12A, when new security information is entered and a storage thereof is selected, the authentication process can be performed. When the authentication process is successfully competed, the controller 180 can change pre-stored security-set information into the new security information.

In addition, when the security-set information changes, as aforementioned, the controller 180 can share the changed information with another user. In this instance, the controller 180 can transmit the changed security-set information to a terminal of the other user who is sharing the security-set information. Information related to the other user who is sharing the security-set information can be present in the memory 170.

As another example, the controller 180 can transmit the changed security-set information to a terminal of another user selected by the user. For example, the controller 180 can output a graphic object corresponding to at least one terminal belonging to the same home network as the terminal, and transmit the changed security-set information to another user corresponding to a graphic object selected from the graphic objects.

In addition, the terminal which has received the changed security-set information, as illustrated in (a) of FIG. 13B, can output guide information 1330 notifying the change in the security-set information, based on the changed security-set information received from the mobile terminal. The terminal which has received the changed security-set information may output the changed security-set information 1340, as illustrated in (b) of FIG. 13B, when a preset authentication process is completed.

Figure 12B:
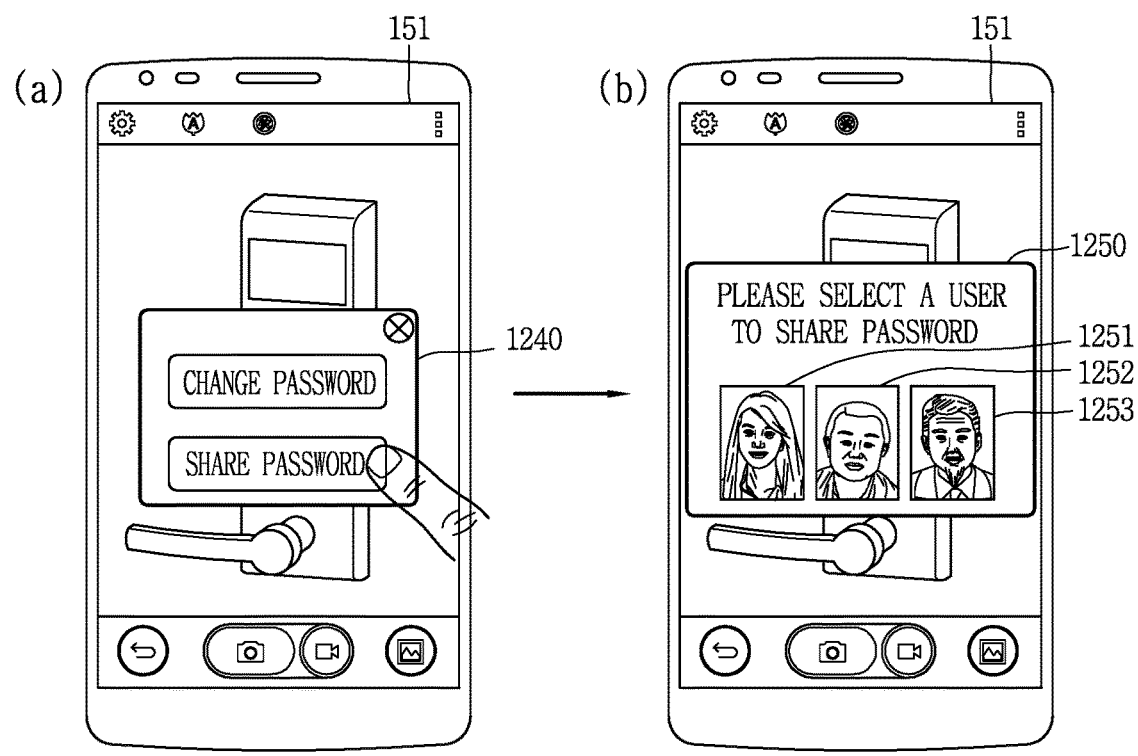

As illustrated in (a) of FIG. 12B, when the function of sharing the security-set information is selected among the additional functions in a guide 1240, the controller 180, as illustrated in (b) of FIG. 12B, can output a list 1250 for selecting a target (person or another user) with which the security-set information is to be shared. The list 1250 can output graphic objects 1251, 1252 and 1253 which represent users to share the security-set information. When one of the graphic objects is selected, the controller 180 can transmit the security-set information to a terminal corresponding to the selected graphic object or an external server. The controller 180 can set the user, who is to share the security-set information, to a user belonging to the same home network as the mobile terminal according to an embodiment of the present invention.

Further, the terminal which has received the security-set information can output guide information 1310 notifying the reception of the security-set information, as illustrated in (a) of FIG. 13A, based on the security-set information received from the mobile terminal. The terminal which has received the changed security-set information can output the received security-set information 1320, as illustrated in (b) of FIG. 13A, when a preset authentication process is completed.

In addition, the mobile terminal according to an embodiment of the present invention can output guide information to induce the change in the security-set information such that the user changes the security-set information, when the security-set information is not changed for a preset duration.

The foregoing examples have been described under the assumption that security-set information relating to a subject recognized from a preview image received through a camera is present. In addition, the mobile terminal according to an embodiment of the present invention can provide a process of registering security-set information corresponding to a subject, when a preview image is received through a camera and the security-set information relating to the subject recognized from the received preview image is not present. Hereinafter, a method of registering security-set information will be described in more detail, with reference to the accompanying drawings. In particular, FIGS. 14A and 14B are conceptual views illustrating a method of registering security information in a mobile terminal according to an embodiment of the present invention.

In the mobile terminal according to an embodiment of the present invention, the controller 180 can perform a process of recognizing a subject from a preview image received through a camera, and registering security-set information relating to the recognized subject when the security-set information relating to the subject is not present.

Figure 14A:
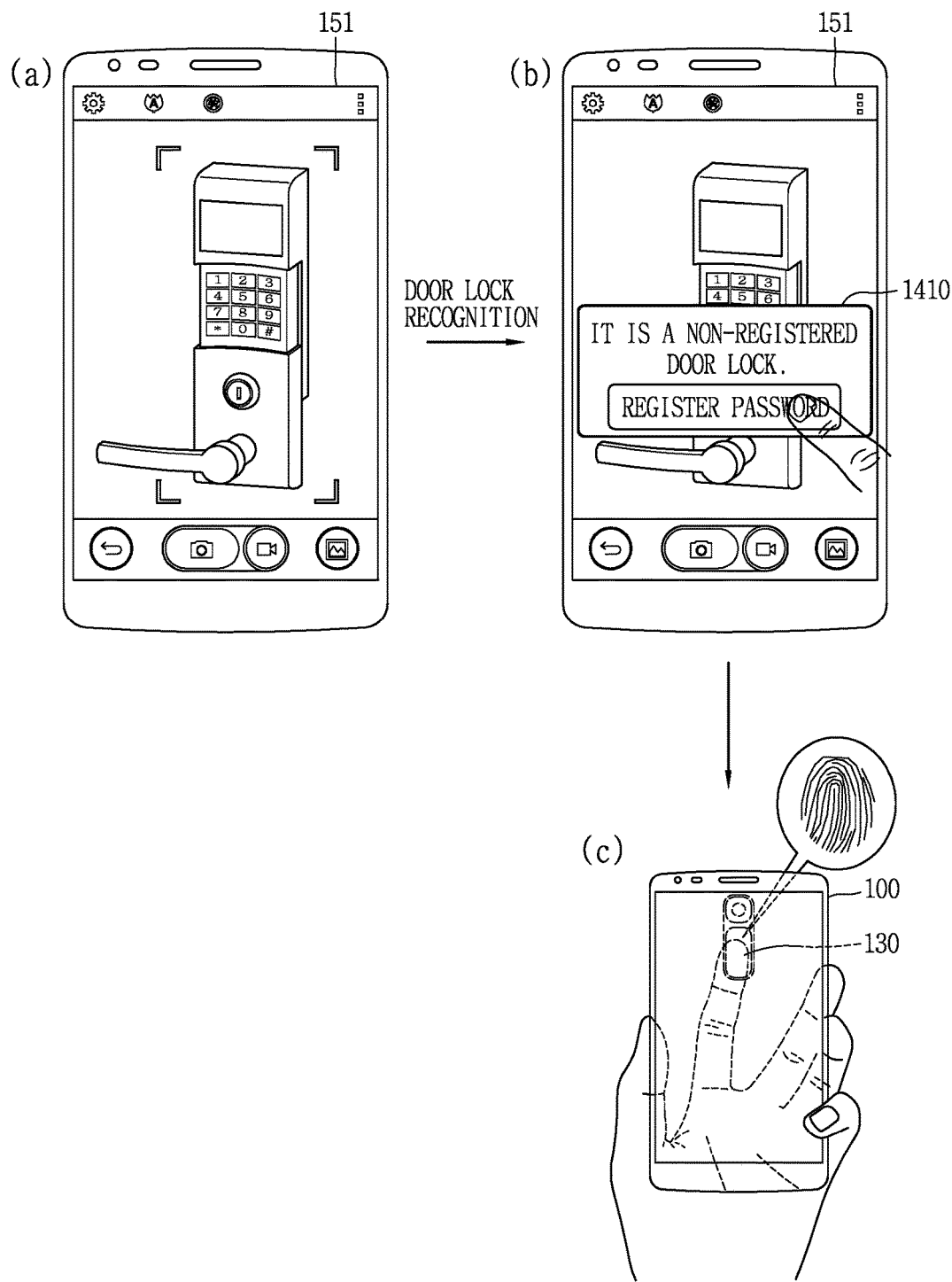
FIGS. 14A and 14B are conceptual views illustrating a method of registering security information, in a mobile terminal in accordance with an embodiment of the present invention.
Figure 14B:
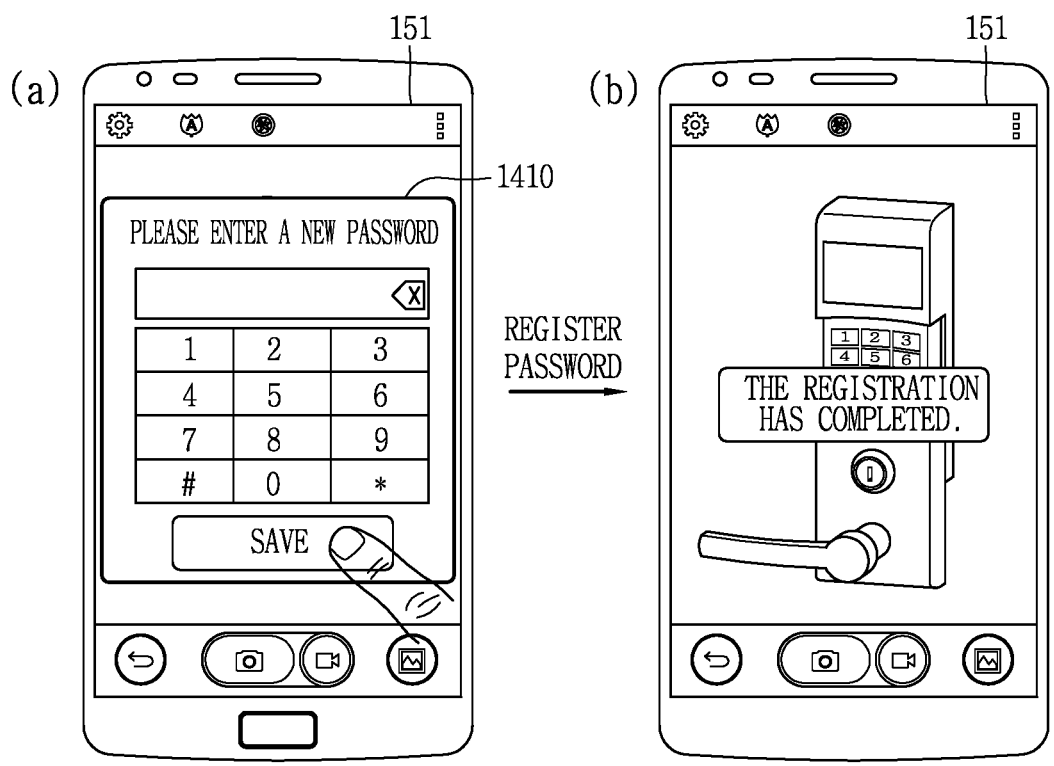

For example, as illustrated in (a) of FIG. 14A, when a subject is recognized but security-set information is not present in relation to the recognized subject, that is, when there is no matching information, the controller 180, as illustrated in (b) of FIG. 14A, can output guide information 1410 to induce a registration of the security-set information. That is, when it is determined that matching information corresponding to the recognized subject is not present, the controller 180 can output the guide information 1410 so user can select whether or not to generate the matching information related to the recognized subject. When the registration of the security-set information relating to the recognized subject is selected, as illustrated in (c) of FIG. 14A, can perform an authentication process. When the authentication process is successfully completed, the controller 180 can execute a process of entering security information to be associated with the subject.

The controller 180 can also execute the process of entering the security information to be associated with the subject, even if the authentication process is not executed. For example, as illustrated in FIG. 14B, a setting screen 1410 for the user to enter security information may be output on the touch screen 151. The controller 180 can register the security information entered through the setting screen 1410 as security-set information corresponding to the subject.

In more detail, when the generation of the matching information in relation to the recognized subject is selected, that is, when the registration of the security information relating to the recognized subject is selected, the controller 180 can capture a preview image received through the camera and obtain an image corresponding to the recognized subject. When the security information related to the recognized subject is entered by the user, the controller 180 can associate the input security information with the obtained image so as to generate the matching information corresponding to the recognized subject.

After the security information is input, the controller 180 can allow the user to select an authentication method or input authentication information. That is, the present invention allows for selecting or inputting an authentication method or authentication information for performing the authentication process, which is performed to output the security-set information related to the recognized subject, during a registration of security information.

The foregoing embodiment has illustrated a method of recognizing a specific subject from a preview image received through a camera and providing security-set information related to the recognized subject. In addition, without limit to the examples, the present invention can provide login information related to a webpage which should be logged in, when such webpage as well as a specific subject is recognized from a preview image received through a camera. Detailed description thereof will be given with reference to the accompanying drawings. In particular, FIGS. 15A, 15B, 16A, 16B and 17 are conceptual views illustrating a method of providing security-set information in association with a webpage, in a mobile terminal in accordance with an embodiment of the present invention.

Figure 15A:
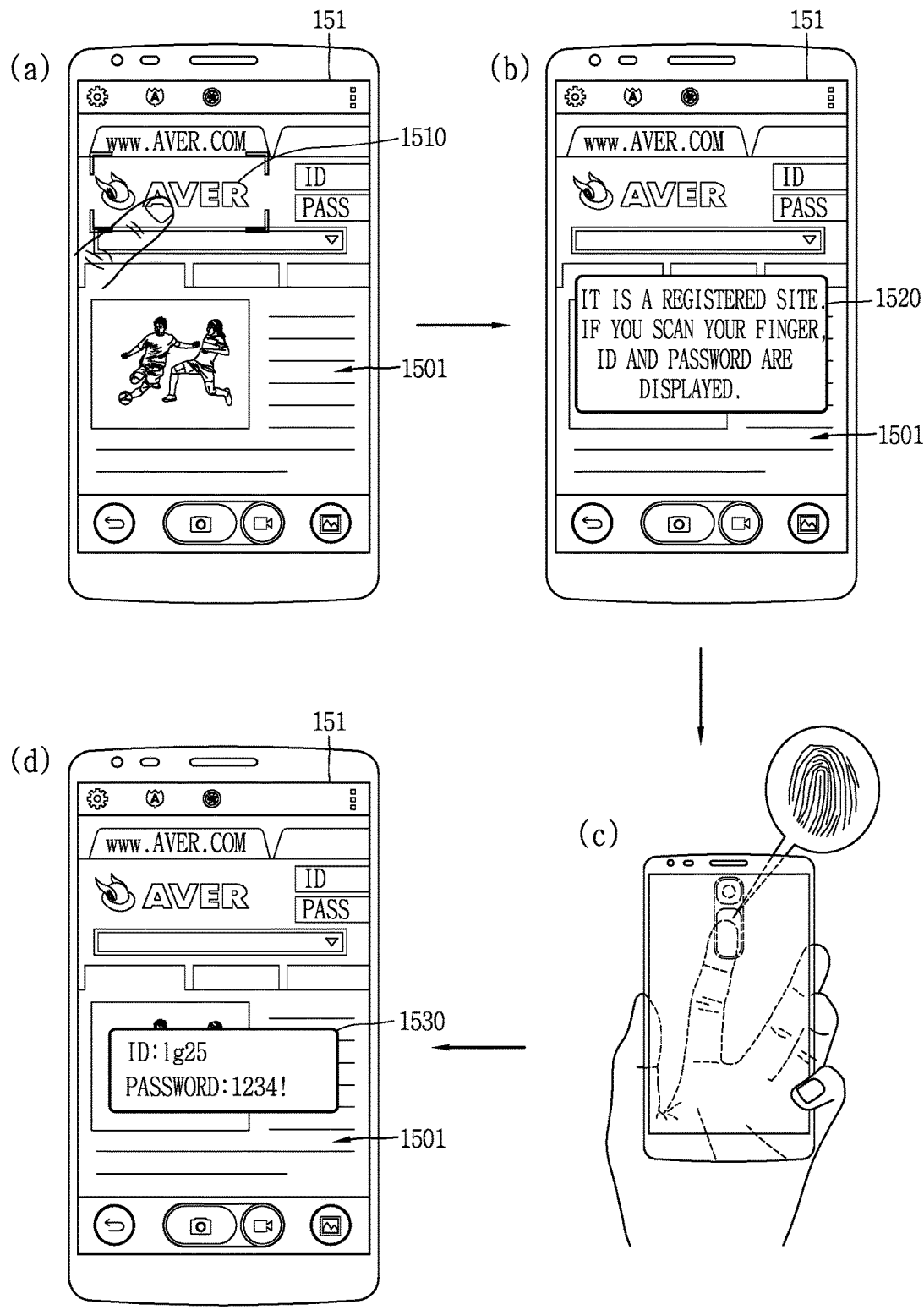
FIGS. 15A, 15B, 16A, 16B and 17 are conceptual views illustrating a method of providing security-set information in association with a webpage, in a mobile terminal in accordance with an embodiment of the present invention.

First, as illustrated in (a) of FIG. 15A, when a website or webpage 1501 which should be logged in is recognized from a preview image received through a camera, the controller 180 can determine whether or not security-set information (e.g., login information including at least one of an ID and a password) related to the recognized webpage is present in the memory 170 or an external server. When it is determined that the login information related to the recognized website or webpage is present, the controller 180 performs an authentication process for outputting the security-set information.

Further, as illustrated in (b) of FIG. 15A, the controller 180 can output guide information 1520 which includes at least one of notification information notifying presence of security-set information relating to the recognized website, and notification information notifying a requirement for an authentication process to be performed to output the security-set information.

As illustrated in (c) of FIG. 15A, when the authentication process is successfully completed through a preset authentication method (e.g., at least one of the authentication methods described with reference to FIGS. 5A to 9), the controller 180, as illustrated in (d) of FIG. 15A, can output the security-set information 1530 relating to the recognized website or webpage. The controller 180 can distinguish a webpage or website based on a logo image 1510 of the webpage or website included in the image (see (a) of FIG. 15A).

In addition, the memory 170 or the external server can store matching information that a logo image of a website or webpage and login information match each other. When the logo of the website or webpage is recognized from the preview image, the controller 180 can search for matching information to confirm whether or not the login information corresponding to the logo is present.

As illustrated in (d) of FIG. 15A, the security-set information (or login information) 1530 can be output on the touch screen 151. As another example, the controller 180 can transmit the security-set information to a server corresponding to the website or webpage. In this instance, the website or webpage may automatically be logged in. The server may provide the logged-in website or webpage on a computer (or a PC) used by the user of the mobile terminal, based on information related to the computer on which the website or webpage is output and information related to the mobile terminal which is capturing the website or webpage.

Figure 15B:
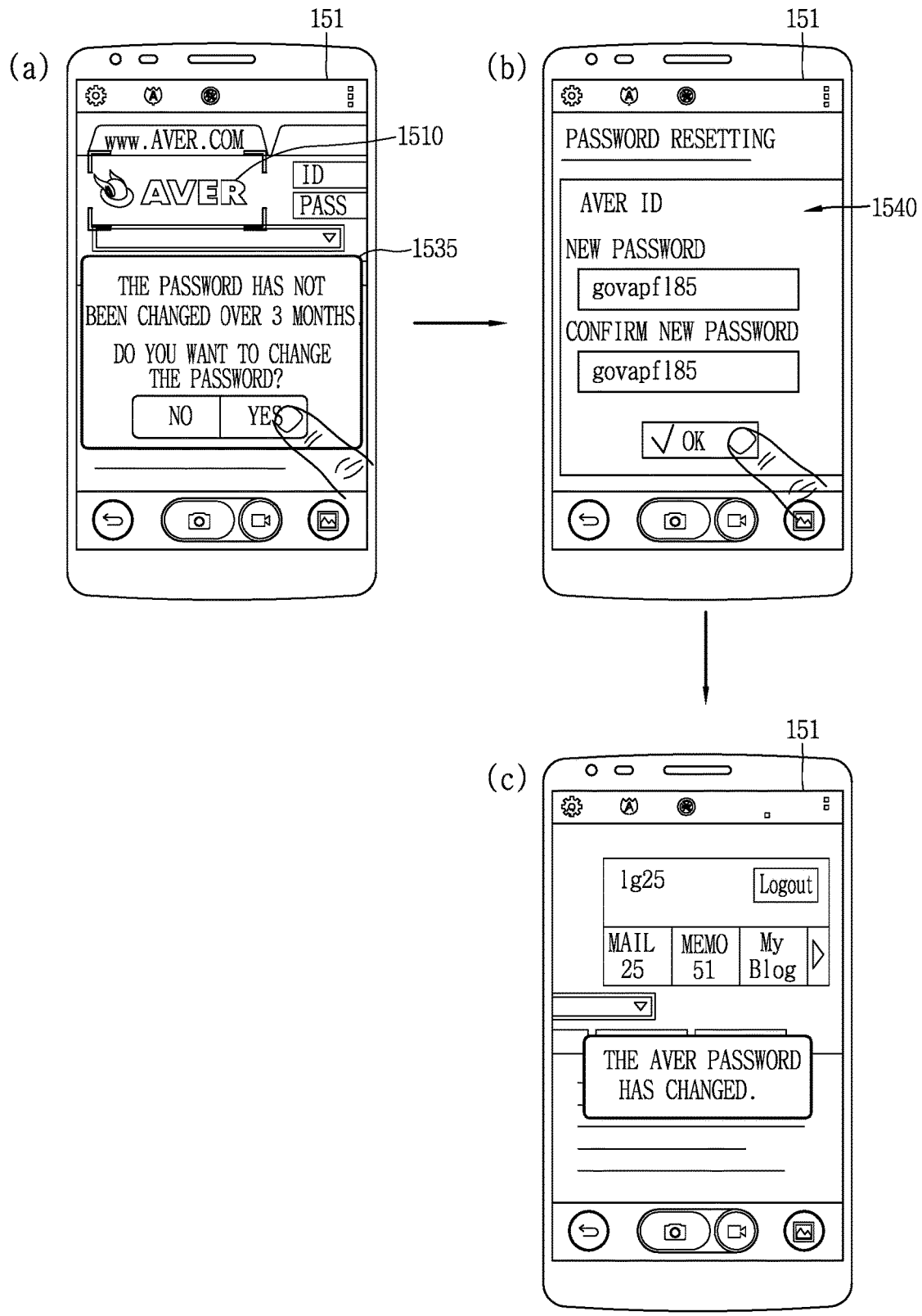

In addition, in the mobile terminal according to an embodiment of the present invention, when the security-set information (or the login information) related to the website or webpage is not changed for a preset period of time, as illustrated in FIG. 15B, the controller 180 can output guide information 1535 for inducing the change in the security-set information so as to induce the change in the security-set information.

As illustrated in (b) and (c) of FIG. 15B, when the security-set information 1540 is changed, the controller 180 can transmit the changed security-set information to the server corresponding to the website or webpage. In this instance, the server corresponding to the website or webpage can change preset security-set information into the received information. This provides user convenience in changing the login information relating to the website or webpage merely by changing the login information in the mobile terminal.

In addition, in the mobile terminal according to an embodiment of the present invention, when a subject is recognized from a preview image received through a camera and security-set information relating to the recognized subject is not present, the controller 180 can perform a process for registering the security-set information relating to the recognized subject.

Figure 16A:
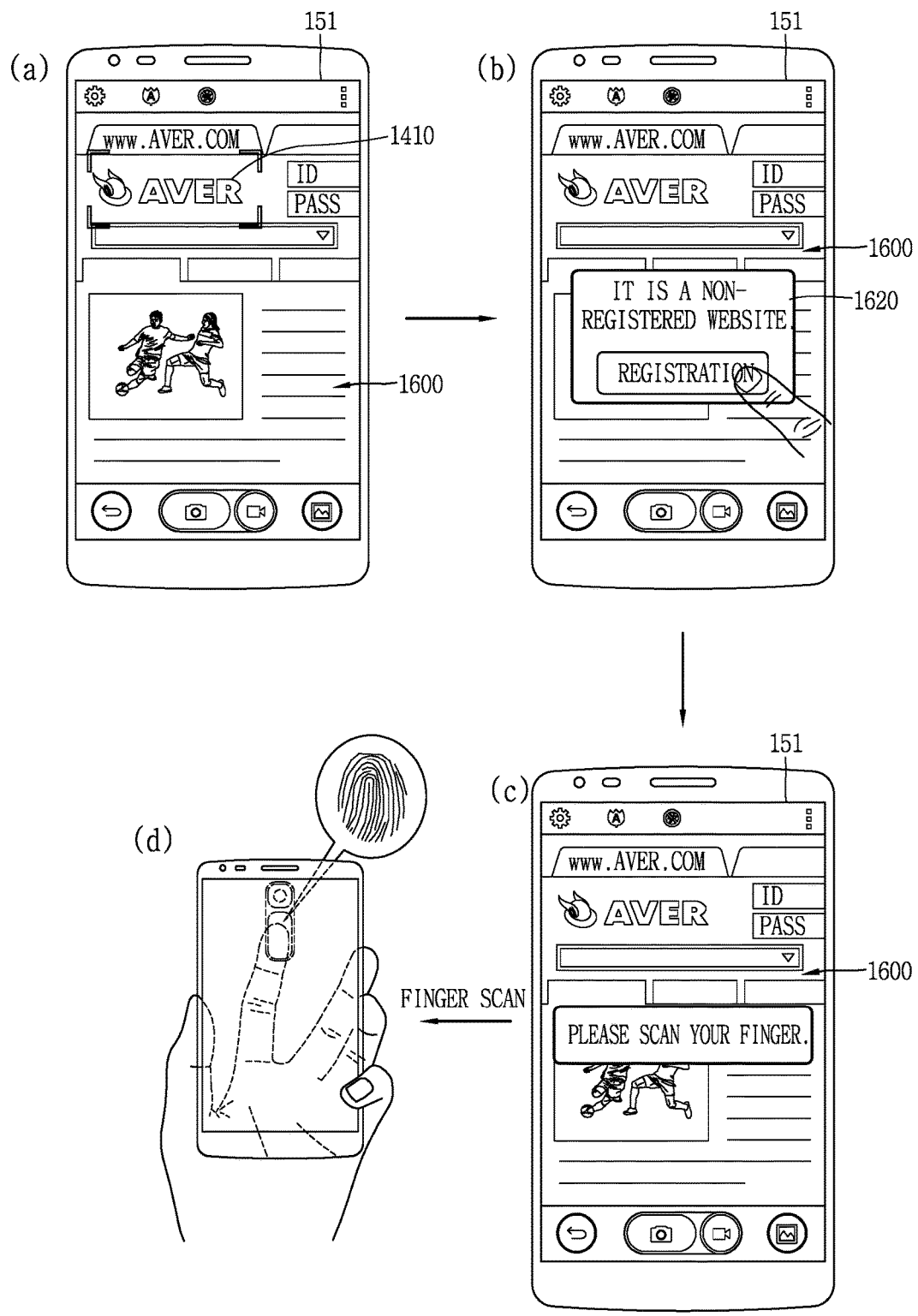
Figure 16B:
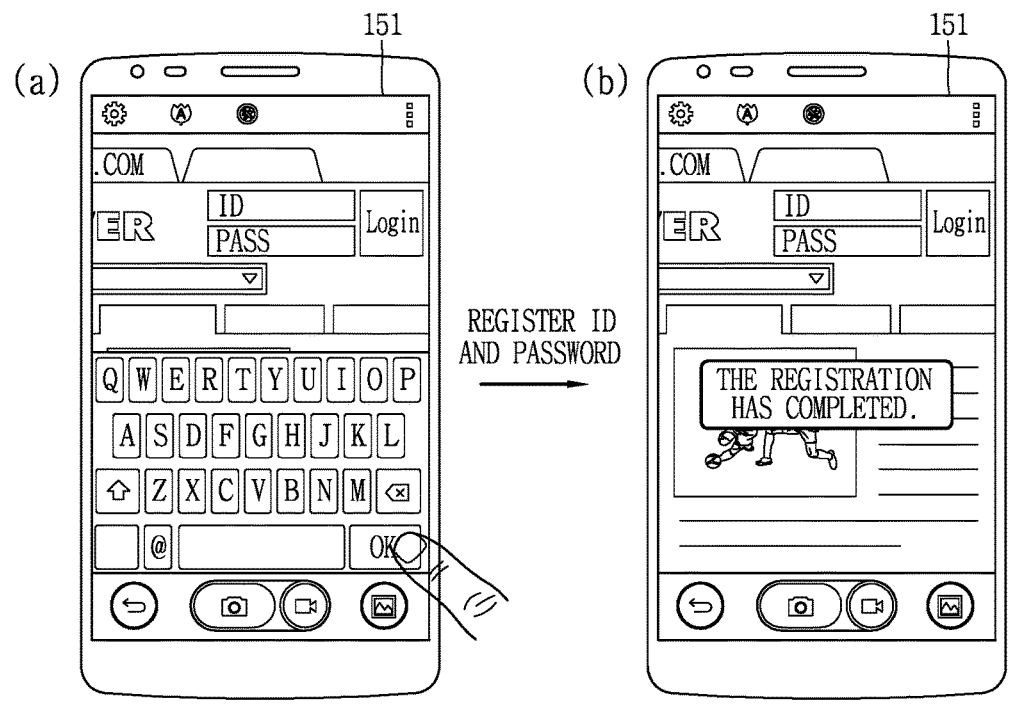

For example, as illustrated in (a) of FIG. 16A, when a webpage (or website) 1600 is recognized but security-set information related to the recognized webpage is not present, namely, when there is no matching information, the controller 180, as illustrated in (b) of FIG. 16A, can output guide information 1620 for inducing the registration of the security-set information. That is, when it is determined that the matching information corresponding to the recognized webpage is not present, the controller 180 can output the guide information 1620 for the user to select whether or not to generate the matching information related to the recognized subject. When the registration of the security-set information relating to the recognized subject is selected by the user, the controller 180, as illustrated in (c) and (d) of FIG. 16A, can perform the authentication process. When the authentication process is successfully performed, the controller 180 can execute a process that the user inputs security information to be associated with the subject.

Also, the controller 180 can directly perform a process of receiving the security information to be associated with the subject from the user, even without performing the authentication process. As such, when the registration of the login information relating to the webpage included in the preview image is selected, as illustrated in (a) of FIG. 16B, a setting screen for the user to input the login information (or the security information) may be output on the touch screen 151. The controller 180 can register the login information input through the setting screen as the login information (or the security-set information) associated with the webpage recognized through the preview image.

In more detail, when the generation of the matching information relating to the recognized webpage is selected, namely, when the registration of the login information related to the recognized subject is selected, the controller 180 can capture the preview image received from the camera, so as to obtain an image corresponding to the recognized webpage. Further, the controller 180 can acquire a logo image 1610 (see (a) of FIG. 16A) of the webpage from the image 1600. When the login information related to the recognized webpage is input by the user, the controller 180 can generate the matching information corresponding to the recognized webpage by associating the input login information with the acquired logo image.

After the login information is input, the controller 180 can allow the user to select an authentication method or input authentication information. That is, in the present invention, the authentication method or authentication information for performing the authentication process, which is performed to output the security-set information related to the recognized webpage, can be selected or input during the registration of the security information.

In another example, in the mobile terminal according to an embodiment of the present invention, even if the matching information including the logo image and the login information corresponding to the webpage is not present in the terminal, when the login information related to the webpage is prestored in the terminal, the prestored login information can be used to provide the login information related to the recognized webpage.

Figure 17:
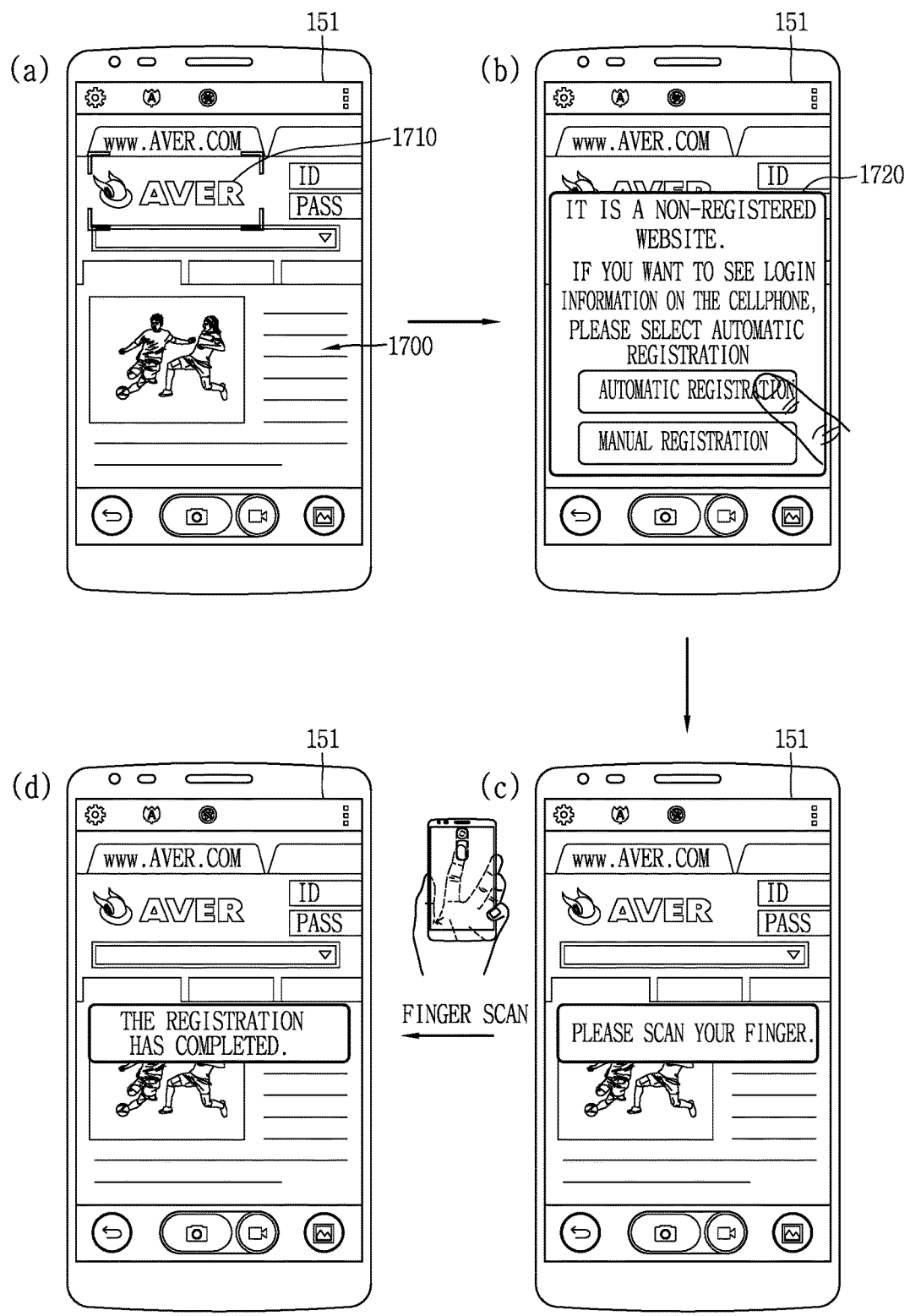

For example, as illustrated in (a) of FIG. 17, when a webpage is recognized from a preview image 1700 received and matching information relating to the webpage is not present, the controller 180, as illustrated in (b) of FIG. 17, can output guide information 1720 for a user to select whether or not to generate the matching information. Further, when login information related to the webpage is prestored in the mobile terminal, the controller 180 can use the prestored login information so as to provide login information related to the recognized webpage.

In this instance, the controller 180 can allow the user to select whether or not to register login information stored in the mobile terminal. When the user selects the registration of the login information stored in the mobile terminal, as illustrated in (c) and (d) of FIG. 17, the controller 180 can utilize the login information stored in the mobile terminal to generate the matching information related to the recognized webpage.

Further, the login information stored in the mobile terminal may be login information which has been entered on the mobile terminal to log in the webpage output on the mobile terminal. As described above, the mobile terminal according to an embodiment of the present invention can provide login information related to a webpage recognized from a preview image received through a camera, which reduces user's inconvenience of having to remember login information related to each different webpage or website in detail.

Thus, the mobile terminal provides login information related to a webpage output on the mobile terminal as well as a webpage recognized from a preview image received through a camera, which will be described in more detail with reference to the accompanying drawings. In particular, FIGS. 18A, 18B, 18C, 19A and 19B are conceptual views illustrating a method of providing security-set information relating to information output on a touch screen in a mobile terminal in accordance with an embodiment of the present invention.

The mobile terminal according to an embodiment of the present invention can provide login information associated with screen information, for which a login operation is required, when such screen information is output on the touch screen 151. Further, the login-required screen information can be a webpage output through a web browser or an execution screen of an application installed on the mobile terminal.

Figure 18A:
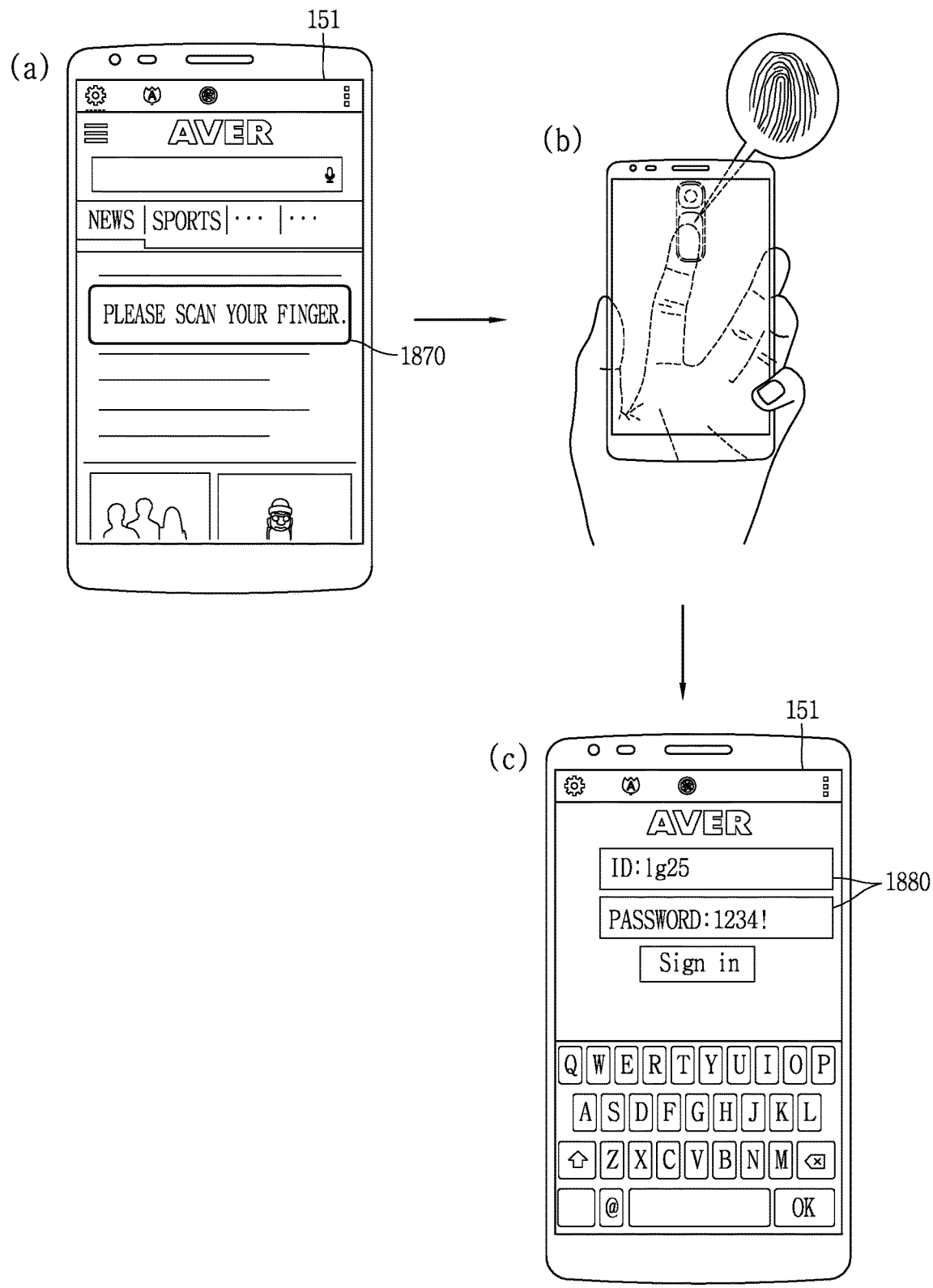
FIGS. 18A, 18B, 18C, 19A, 19B and 20 are conceptual views illustrating a method of providing security-set information in association with information output on a touch screen in a mobile terminal in accordance with an embodiment of the present invention.

As illustrated in (a) of FIG. 18A, when login information related to screen information (e.g., a webpage) output on the touch screen 151 is present, the controller 180 can output guide information 1870 for inducing the user to perform an authentication process. As illustrated in (b) and (c) of FIG. 18A, when the authentication process is successfully completed, the controller 180 can output login information 1880. Further, the controller 180 can output the login information directly on an area on which the login information is input. This reduces the user's inconvenience of having to input the login information separately.

Further, the authentication process may be performed by at least one of the authentication methods described with reference to FIGS. 5A to 9, detailed description of which will be omitted. Thus, in the mobile terminal according to an embodiment of the present invention, the controller 180 can determine whether or not security-set information related to screen information (or webpage) output on the touch screen is present. When the security-set information is present according to the determination result, the controller 180 can output guide information for inducing the authentication process associated with the output of the security-set information.

Figure 18B:
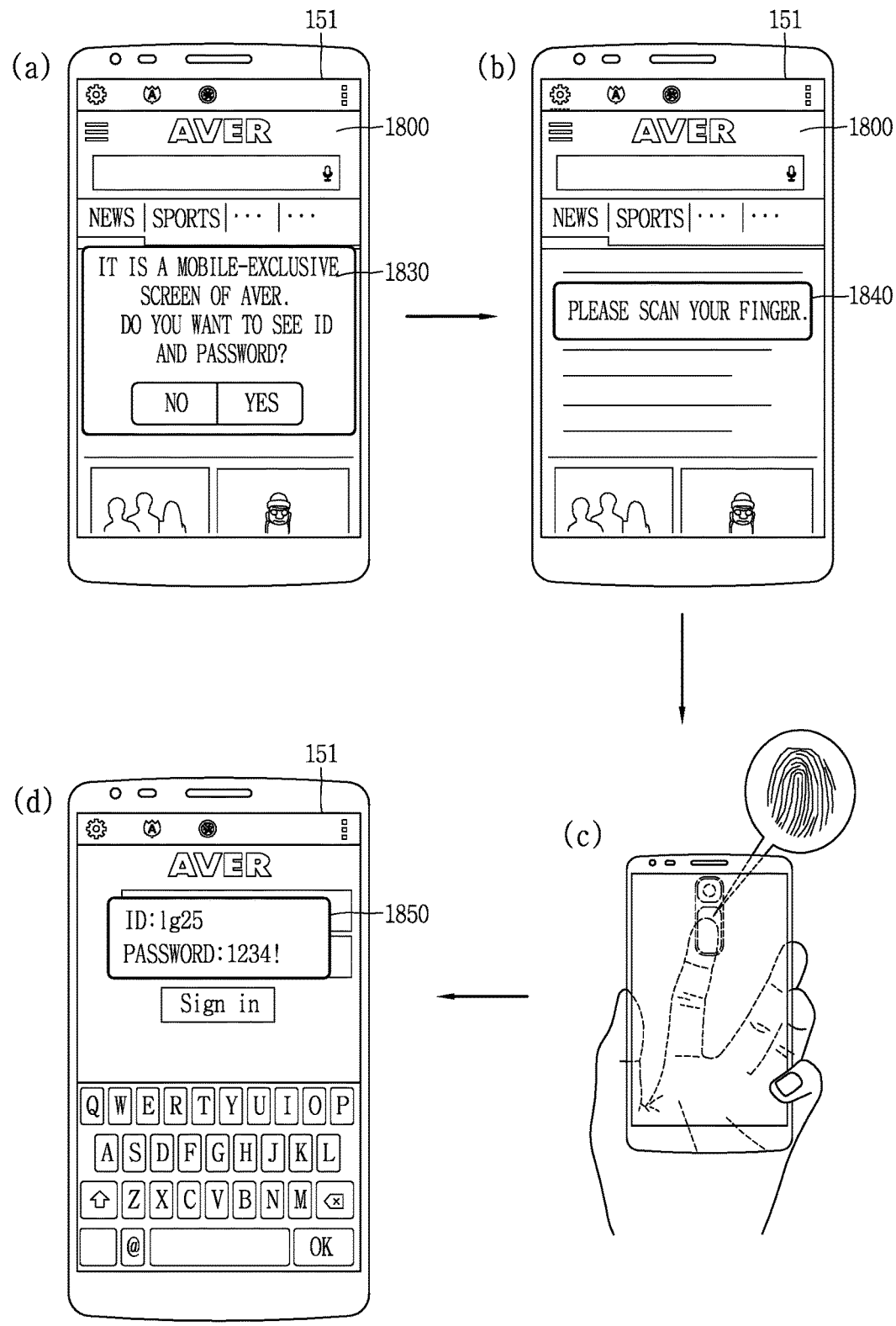

The guide information may be the information 1870 for inducing the performance of the authentication process as illustrated in FIG. 18A, or may be information 1830 for notifying the presence of the login information associated with the webpage output on the touch screen 151 and information 1840 for inducing the performance of the authentication process, as illustrated in (a) and (b) of FIG. 18B.

As illustrated in (d) of FIG. 18B, the controller can also output the login information through a popup window 1850. Thus, after the guide information is output, when the authentication process for the output of the login information (or the security-set information) is completed based on the authentication information input by the user, the controller 180 can control the touch screen 151 to output the login information.

As illustrated in FIGS. 18A and 18B, when login information associated with screen information output on the touch screen 151 is present, the controller 180 can output guide information, even without a separate user request, to notify the user of the presence of the login information.

The controller 180 can also output login information related to screen information output, only in response to a user request. For example, as illustrated in (a) to (c) of FIG. 18C, the controller 180 can perform a process of outputting login information when a graphic object for activating a function of providing the login information in relation to screen information 1800 output on the touch screen 151 is selected.

Figure 18C:
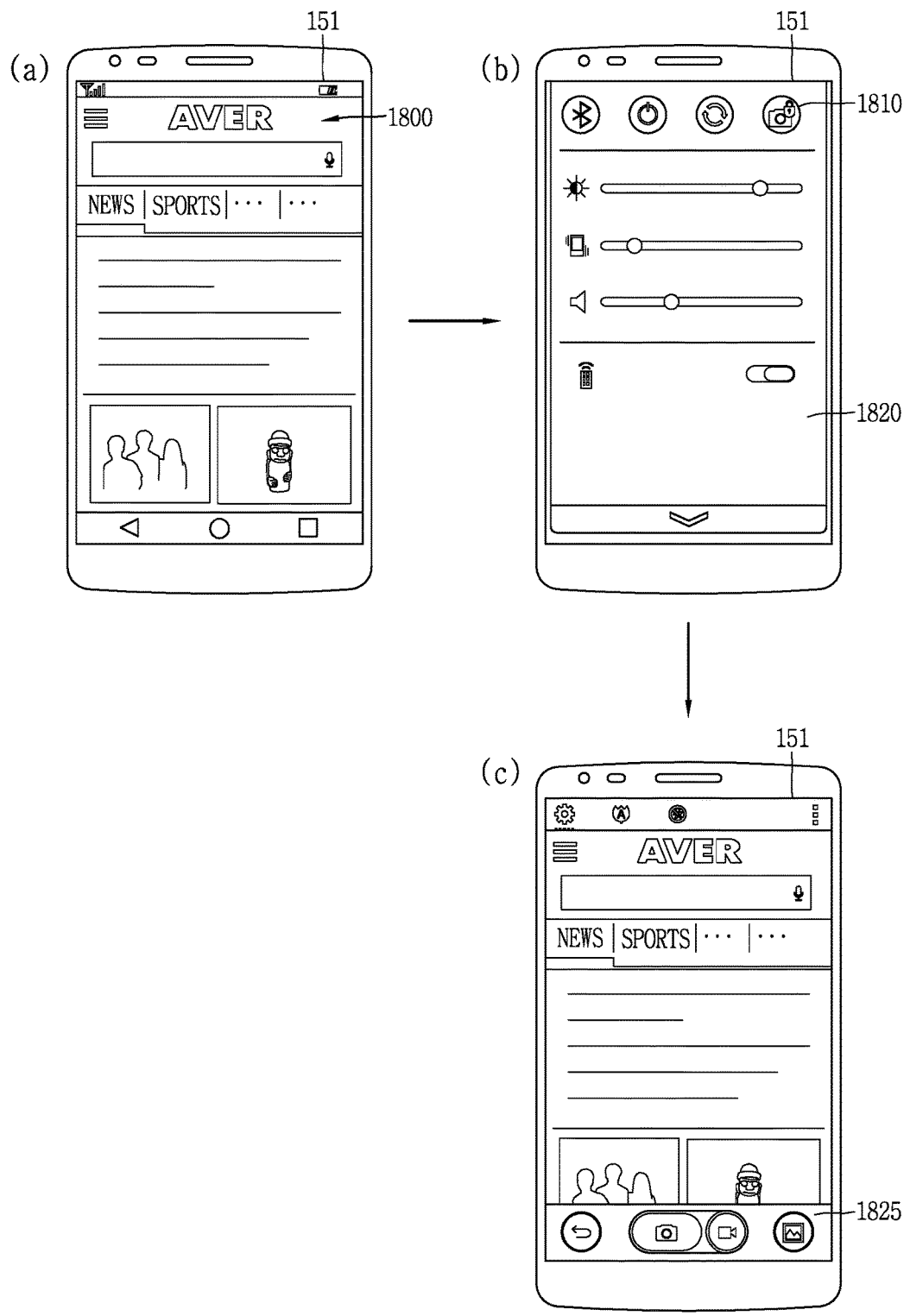

For example, as illustrated in (b) of FIG. 18C, a graphic object 1810 (or an icon) for activating a function of providing login information related to screen information output on the touch screen 151 may be included in a state display window (a function control window, a curtain window, a control window or an indicator window) 1820.

The graphic object 1810 may be output only when the login information associated with the output screen information is present. The state display window 1820 may be output when a preset touch (e.g., a drag touch) having a preset direction is applied to a preset one edge of the touch screen 151. The output state display window 1820 may be closed in response to a preset touch having an opposite direction to the preset direction.

In addition, when the graphic object 1810 included in the state display window 1820 is selected, the controller 180 can stop outputting the state display window 1820. When the graphic object is selected, the controller 180, as illustrated in (c) of FIG. 18C, can output a guide image 1825. The guide image 1825 includes information for notifying that a process of recognizing screen information output on the touch screen 151 and a process of searching for login information corresponding to the recognized screen information are undergoing.

Figure 19A:
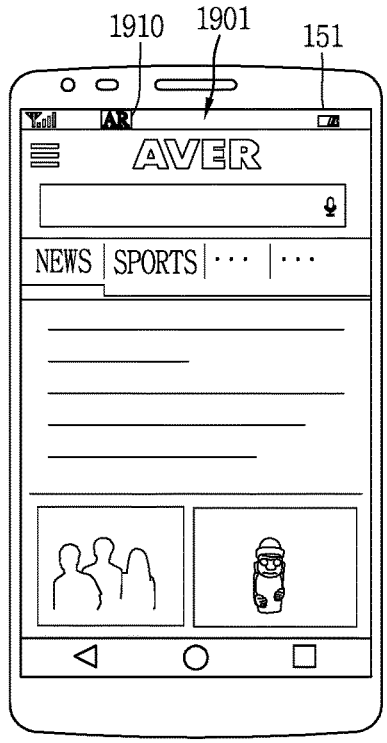

In another example, as illustrated in FIG. 19A, the controller 180 can output on a state display region 1901 a graphic object 1910 for activating a function of providing login information related to screen information output. Further, the graphic object can be output only when the login information related to the output screen information is present.

In addition, the state display region 1901 can be a region which includes state information (battery information, wireless signal information, communication method information, etc.) related to the mobile terminal, and event notification information.

Figure 19B:
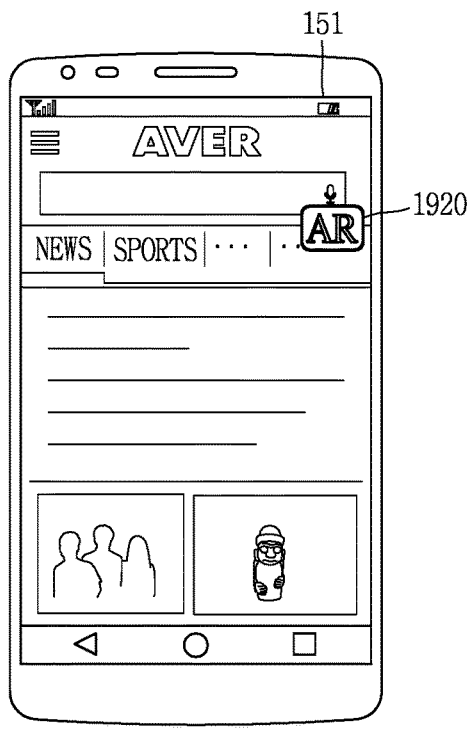

In another example, as illustrated in FIG. 19B, the controller 180 can output a graphic object 1920 for activating the function of providing login information related to output screen information, on an arbitrary area of the touch screen 151. Further, the graphic object can be output only when the login information related to the output screen information is present. In addition, in the mobile terminal according to an embodiment of the present invention, there are several variation embodiments of the method of providing the login information related to the output screen information, in addition to those aforementioned embodiments.

Figure 20:
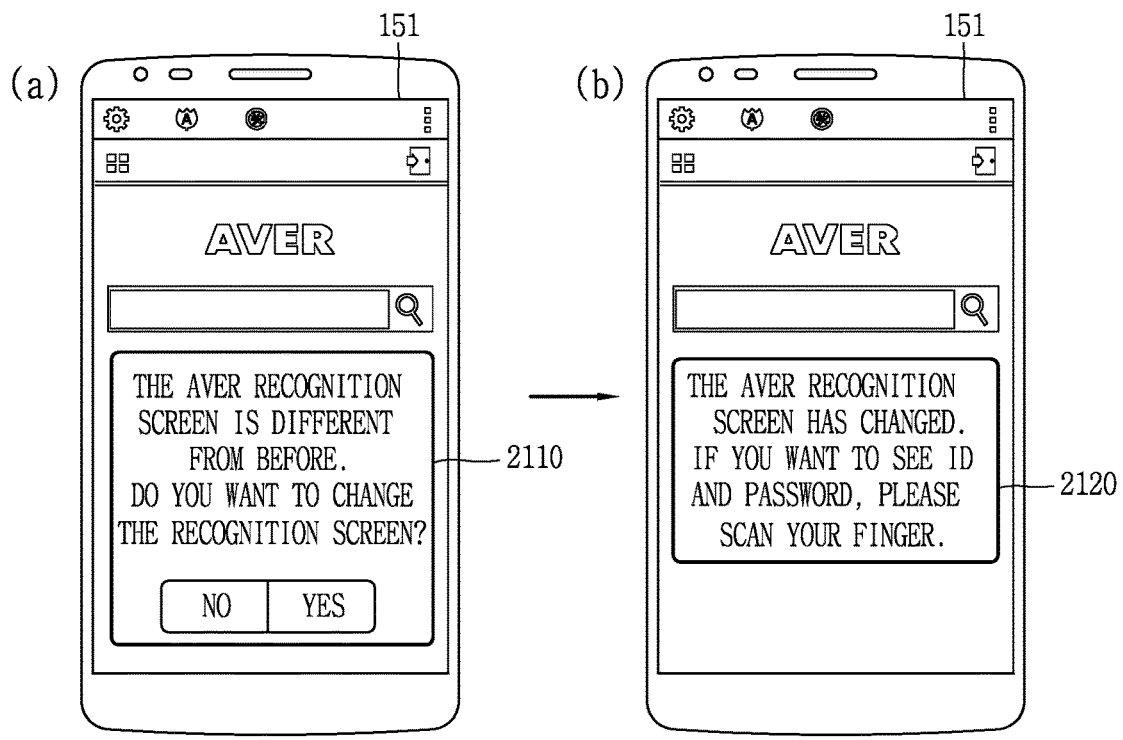

In the mobile terminal according to an embodiment of the present invention, when a design is changed on screen information such as a webpage or the like, namely, when logo information is changed, the matching information can be updated to the changed information. For example, as illustrated in (a) of FIG. 20, when a design or a logo image of output screen information is different from prestored information, the controller 180 can display a guide 2100 allowing a user to select whether or not to store the changed design or logo image instead of the prestored information. When the change of the prestored information is selected by the user, the currently-output screen information can be captured and at least part of the captured image can be used to update the prestored information. Further, the stored logo image can be changed into at least part of the captured image. In this instance, the matching information may be updated to the at least part of the captured image. As shown in (b) of FIG. 20, the controller 180 can output a guide 2120 indicating the screen has changed.

In addition, as aforementioned, in addition to the method of storing the changed design or logo image based on the user selection, when the design or the like of the output screen information is changed even without a user selection, the controller 180 can capture the image and update the matching information.

In this instance, the matching information may include URL information, logo image information and login information corresponding to the associated screen information. The controller 180 can recognize that the matching information has to change when at least one of information included in the matching information is different. That is, when the logo image of the webpage output on the touch screen 151 changes, the controller 180 can compare the changed logo image with the logo image corresponding to the URL of the output webpage in the matching information and recognize that the logo image of the webpage has changed.

As described above, according to an embodiment of the present invention, a subject to be captured can be recognized from a preview image received through a camera, and security-set information or security information related to the recognized subject can be output. This increases user convenience in that the user does not have to remember the security-set information related to the subject in detail.

In addition, according to an embodiment of the present invention, when a subject is recognized, an authentication process may be performed for authenticating a user who is permitted to access security-set information. This increases security for the access to the security-set information, thereby protecting user's privacy.

According to an embodiment of the present invention, when an Internet site (or a website) needs to be logged in is output, the webpage can be recognized. When a preset authentication process is completed, security-set information (or login information) related to the webpage is provided. Therefore, the user does not have to separately remember information related to a login-required site, thereby enhancing user convenience.

According to an embodiment of the present invention, when a user who is permitted to access security-set information is recognized, a graphic object for guiding an access to the security-set information is output, and various functions associated with security are performed according to various touch gestures applied to the graphic object. Therefore, the user can perform the security-related functions more intuitively and conveniently by utilizing only the graphic object, without an entrance to several steps of menus for performing such functions.

The aforementioned present invention can be implemented as computer-readable codes in a program-recorded medium. The computer-readable medium may include all types of recording devices each storing data readable by a computer system. Examples of such computer-readable media may include ROM, RAM, CD-ROM, magnetic tape, floppy disk, optical data storage element and the like. Also, the computer-readable medium may also be implemented as a format of carrier wave (e.g., transmission via an Internet). The computer may include the controller 180 of the mobile terminal. Therefore, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal comprising:
   a camera provided at a terminal body;
   a touch screen configured to output a preview image received through the camera; and
   a controller configured to:
   recognize an object from the preview image,
   determine whether an image and security-set information both corresponding to the object are included in matching information stored in a memory,
   perform an authentication process associated with the object for obtaining security-set information for operating the object included in the preview image when the image and the security-set information both corresponding to the object are included the matching information, and
   output the security-set information when the authentication process is successfully performed based on input authentication information.

2. The mobile terminal of claim 1, wherein the controller is further configured to:
   output guide information for entering new set-security information for the object when the security-set information is not included in the memory for the object in the preview image.

3. The mobile terminal of claim 2, wherein the controller is further configured to:
   capture the preview image and obtain an image corresponding to the object, and
   match the obtained image with the entered new set-security information in the memory.

4. The mobile terminal of claim 1, wherein the controller is further configured to:
   output guide information for inputting the authentication information.

5. The mobile terminal of claim 4, further comprising:
   a finger scan sensor configured to sense a fingerprint of a contacted finger,
   wherein the controller is further configured to output the security-set information when the fingerprint sensed by the finger scan sensor corresponds to prestored fingerprint information.

6. The mobile terminal of claim 1, wherein the controller is further configured to:
   change the security-set information to input new security-set information, in response to a request for changing the security-set information related to the object after the security-set information is output.

7. The mobile terminal of claim 6, wherein the controller is further configured to:
   display at least one graphic object on the touch screen corresponding to at least one other terminal, respectively, belonging to a same home network as the mobile terminal, and
   transmit the new security-set information to the at least one other terminal.

8. The mobile terminal of claim 1, wherein the controller is further configured to:
   output guide information for inducing a change in the security-set information, when the security-set information has not been changed for a preset period of time.

9. The mobile terminal of claim 1, wherein the controller is further configured to:
   transmit the security-set information to the object through a wireless communication processor.

10. The mobile terminal of claim 1, wherein the controller is further configured to:
    display a plurality of graphic objects corresponding to a plurality of authentication methods, respectively, in association with performing the authentication process, and
    perform a different authentication process according to which one of the plurality of graphic objects is selected.

11. The mobile terminal of claim 10, wherein the plurality of authentication methods comprises at least one of a finger scan method, a face recognition method, a voice recognition method, a password input method and a touch pattern input method.

12. A method of controlling a mobile terminal, the method comprising:
    outputting, via a touch screen of the mobile terminal, a preview image received through a camera of the mobile terminal;
    recognizing an object from the preview image;
    determining whether an image and security-set information both corresponding to the object are included in matching information stored in a memory;
    performing, via a controller of the mobile terminal, an authentication process associated with the object for obtaining security-set information for operating the object included in the preview image when the image and the security-set information both corresponding to the object are included the matching information; and
    outputting, via the controller, the security-set information when the authentication process is successfully performed based on input authentication information.

13. The method of claim 12, further comprising:
    outputting, via the controller, guide information for entering new set-security information for the object image when the security-set information is not included in the memory for the object in the preview image.

* * * * *